United States Patent
Eichhorn et al.

(10) Patent No.: US 6,946,006 B2
(45) Date of Patent: Sep. 20, 2005

(54) BLACK DYE MIXTURES OF FIBER-REACTIVE AZO DYES AND USE THEREOF FOR DYEING MATERIAL CONTAINING HYDROXY- AND/OR CARBOXAMIDO GROUPS

(75) Inventors: Joachim Eichhorn, Frankfurt am Main (DE); Ronald Pedemonte, Westley Chapel, NC (US)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 92 days.

(21) Appl. No.: 10/157,293

(22) Filed: May 29, 2002

(65) Prior Publication Data

US 2003/0140432 A1 Jul. 31, 2003

Related U.S. Application Data

(60) Provisional application No. 60/295,193, filed on Jun. 1, 2001.

(51) Int. Cl.[7] ........................... C09B 67/24; D06P 1/384
(52) U.S. Cl. .................................... 8/549; 8/543; 8/641
(58) Field of Search ............................. 8/641, 549, 543

(56) References Cited

U.S. PATENT DOCUMENTS

| | | | |
|---|---|---|---|
| 5,330,539 A | 7/1994 | Phillips et al. | 8/549 |
| 5,445,654 A | 8/1995 | Hussong et al. | 8/546 |
| 5,559,215 A | 9/1996 | Dannheim et al. | 534/573 |
| 5,611,821 A | 3/1997 | Huang et al. | 8/549 |
| 5,779,739 A | 7/1998 | Von Der Eltz et al. | 8/549 |
| 6,281,340 B1 | 8/2001 | Eichhorn | 534/642 |
| 6,368,362 B1 | 4/2002 | Pedemonte et al. | 8/549 |

FOREIGN PATENT DOCUMENTS

| | | |
|---|---|---|
| EP | 0 679 697 | 11/1995 |
| EP | 0 681 008 | 11/1995 |
| EP | 0 735 112 | 10/1996 |
| EP | 0 976 793 | 2/2000 |
| EP | 0 982 374 | 3/2000 |
| EP | 1 046 677 | 4/2000 |
| EP | 1 035 173 | 9/2000 |
| EP | 1 046 679 | 10/2000 |
| EP | 1 048 695 | 11/2000 |
| JP | 58-160362 | 9/1983 |
| KR | 94-2560 | 3/1994 |
| WO | WO 93/18224 | 9/1993 |
| WO | WO 98/42784 | 10/1998 |
| WO | WO 98/42785 | 10/1998 |

*Primary Examiner*—Margaret Einsmann
(74) *Attorney, Agent, or Firm*—Connolly Bove Lodge & Hutz

(57) ABSTRACT

The present invention describes a dye mixture containing at least one dyestuff of the general formula

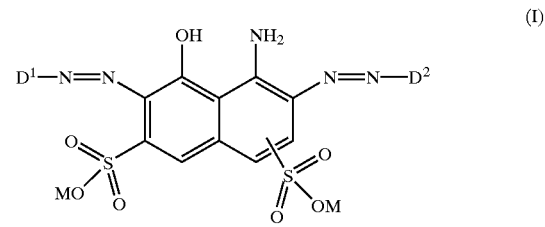

(I)

and one or more reactive dyes of the general formula (II),

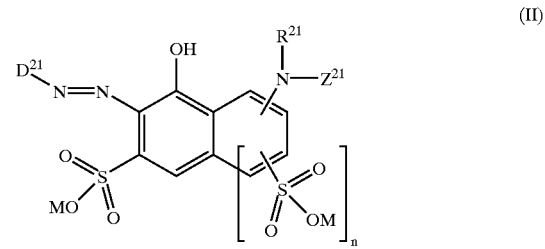

(II)

wherein $D^1$, $D^2$, $D^{21}$, $R^{21}$, $Z^{21}$, M and n are defined in the specification, a process for its preparation and its use for dyeing and printing hydroxyl- and/or carboxamido-containing material.

21 Claims, No Drawings

BLACK DYE MIXTURES OF FIBER-REACTIVE AZO DYES AND USE THEREOF FOR DYEING MATERIAL CONTAINING HYDROXY- AND/OR CARBOXAMIDO GROUPS

RELATED APPLICATIONS

This application claims benefit to provisional application No. 60/295,193 filed Jun. 1, 2001 which is incorporated by reference in its entirety for all useful purposes.

BACKGROUND OF THE INVENTION

1. Field of Invention

The present invention relates to the field of fiber-reactive dyes. It describes black mixtures of fiber-reactive dyestuffs and use thereof for dyeing hydroxy- and/or carboxamido-containing fiber material.

2. Description of the Prior Art

Various patent documents disclose dye mixtures of fiber reactive dyes and their use for dyeing hydroxy- and/or carboxamido-containing fiber material in black shades. Examples are U.S. Pat. No. 5,445,654 and U.S. Pat. No. 5,611,821, KR 94-2560 and Sho 58-160362. However the dyeing properties of these dye mixtures in view of special application methods, as well as their applicability to fiber material and the fastness properties of the dyed material, are in need of improvement in some instances. Additionally most known mixtures of reactive dyestuffs have to be dyed in the presence of 50 to 100 g/l of electrolyte salts. The patent documents WO 98/42784, WO 98/42785, WO 93/18224 and U.S. Pat. No. 5,330,539 describe dyes which can be dyed in the presence of low amounts of salt but in the absence of salt they give dyeings having only very poor color strengths.

As due to ecological and economic reasons the contamination of dye-house waste-water has to be reduced there is a demand for reactive dyestuffs, which are applicable in the presence of low amounts or even in the absence of electrolyte salts giving dyeings of a high color strength.

SUMMARY OF THE INVENTION

It has now been found that mixtures comprising reactive dyes of formula (I) and (II) meet these requirements.

The present invention thus provides dye mixtures comprising one or more reactive dyes of the general formula (I)

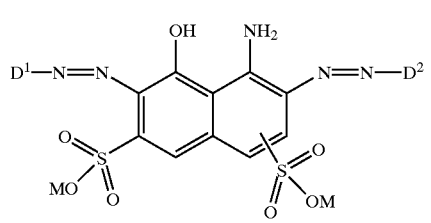

(I)

and one or more reactive dyes of the general formula (II),

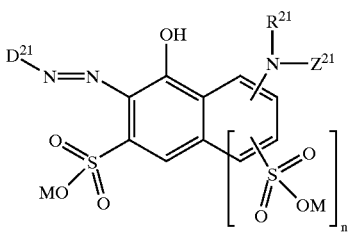

(II)

where
$D^1$ and $D^2$ each represent a group of the general formula (1)

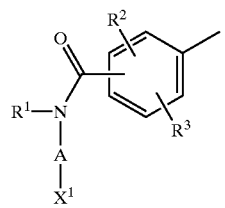

(1)

wherein
$R^1$ is hydrogen, $(C_1-C_4)$-alkyl, aryl or phenyl substituted by on, two or three independent groups selected from the group consisting of, $(C_1-C_4)$-alkyl, $(C_1-C_4)$-alkoxy, hydroxyl, sulfo, carboxyl, amido and halogen;

$R^2$ and $R^3$ are independently hydrogen, $(C_1-C_4)$-alkyl, $(C_1-C_4)$-alkoxy, hydroxyl, sulfo, carboxyl, amido or halogen; and A is a phenylene group of the general formula (2)

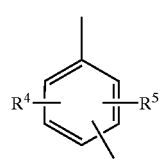

(2)

where
$R^4$ and $R^5$ are independently hydrogen, $(C_1-C_4)$-alkyl, $(C_1-C_4)$-alkoxy, hydroxyl, sulfo, carboxyl, amido or halogen; or A is
a naphthylene group of the general formula (3)

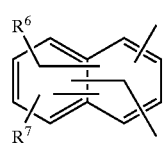

(3)

where
$R^6$ and $R^7$ are independently hydrogen, $(C_1-C_4)$-alkyl, $(C_1-C_4)$-alkoxy, hydroxyl, sulfo, carboxyl, amido or halogen; or A is
a polymethylene group of the general formula (4)

(4)

where
k is an integer greater than 1 and
$R^8$ and $R^9$ are independently hydrogen, $(C_1–C_4)$-alkyl, $(C_1–C_4)$-alkoxy, hydroxyl, cyano, amido, halogen or aryl; and
$X^1$ is hydrogen or —$SO_2$-Z;
or $D^1$ and $D^2$ each represent a phenyl group of the general formula (5)

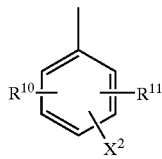

(5)

where
$R^{10}$ and $R^{11}$ are independently hydrogen, $(C_1–C_4)$-alkyl, $(C_1–C_4)$-alkoxy, hydroxyl, sulfo, carboxyl, amido or halogen; and
$X^2$ has one of the meanings of $X^1$;
or $D^1$ and $D^2$ each represent a naphthyl group of the general formula (6)

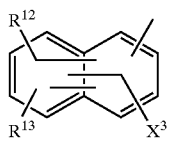

(6)

where
$R^{12}$ and $R^{13}$ are independently hydrogen, $(C_1–C_4)$-alkyl, $(C_1–C_4)$-alkoxy, hydroxyl, sulfo, carboxyl, amido or halogen;
$X^3$ has one of the meanings of $X^1$;
Z is —CH=$CH_2$, —$CH_2CH_2Z^1$ or hydroxyl, where
$Z^1$ is hydroxyl or an alkali-detachable group;
M is hydrogen or an alkali metal;
$D^{21}$ has one of the meanings of $D^1$ or $D^2$ or is a group of formula (7) or (8)

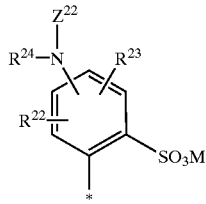

(7)

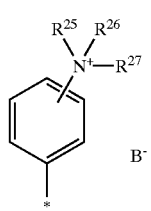

(8)

where
$R^{22}$ and $R^{23}$ have independently of one another one of the meanings of $R^2$ and $R^3$;

$R^{24}$ is hydrogen, $(C_1–C_4)$-alkyl, phenyl which is unsubstituted or substituted by $(C_1–C_4)$-alkyl, $(C_1–C_4)$-alkoxy, sulfo, halogen, carboxy; and
$Z^{22}$ is a group of the general formula (9) or (10) or formula (11)

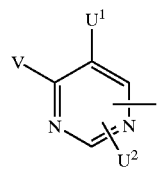

(9)

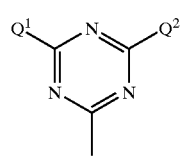

(10)

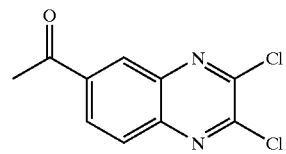

(11)

wherein
V is fluorine or chlorine;
$U^1$ and $U^2$ are independently of one another fluorine, chlorine or hydrogen; and
$Q^1$ and $Q^2$ are independently of one another chlorine, fluorine, cyanamide, hydroxy, $(C_1–C_6)$-alkoxy, phenoxy, sulfophenoxy, mercapto, $(C_1–C_6)$-alkylmercapto, pyridino, carboxypyridino, carbamoylpyridino, or a group of the general formula (12) or (13)

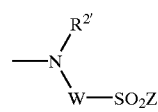

(12)

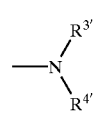

(13)

where
$R^{2'}$ is hydrogen, $(C_1–C_6)$-alkyl, sulfo-$(C_1–C_6)$-alkyl, phenyl which is unsubstituted or substituted by $(C_1–C_4)$-alkyl, $(C_1–C_4)$-alkoxy, sulfo, halogen, carboxy, acetamido, ureido;
$R^{3'}$ and $R^{4'}$ have independently of one another one of the meanings of $R^{2'}$, or are a group of the general formula (8), or form a cyclic ring system, such as —$(CH_2)_j$— with j being 4 or 5, or alternatively —$(CH_2)_2$-E-$(CH_2)_2$— with E being oxygen, sulfur, sulfo, —$NR^{5'}$— with $R^{5'}$ being $(C_1–C_6)$-alkyl;
W is phenylene which is unsubstituted or substituted by 1 or 2 substituents such as $(C_1–C_4)$-alkyl, $(C_1–C_4)$-alkoxy, carboxy, sulfo, chlorine, bromine, or is $(C_1–C_4)$-alkylene-arylene or $(C_2–C_6)$-alkylene, which can be interrupted by oxygen, sulfur, sulfono, amino, carbonyl, carbonamido, or is phenylene-CONH-phenylene which is unsubstituted or substituted by $(C_1-C_4)$-alkyl, $(C_1-C_4)$-alkoxy, hydroxyl, sulfo, carboxyl, amido, ureido or halogen, or naphthylene which is unsubstituted or substituted by one or two sulfo groups; and Z is as defined above;

$R^{25}$, $R^{26}$ and $R^{27}$ are independently $(C_1-C_4)$-alkyl or $(C_1-C_4)$-hydroxyalkyl;

$B^-$ is an equivalent for an anion such as hydrogensulfate, sulfate, fluoride, chloride, bromide, dihydrogenphosphate, hydrogenphosphate, phosphate, hydroxide, acetate;

$R^{21}$ has one of the meanings of $R^{24}$;

$Z^{21}$ is hydrogen, $(C_2-C_6)$-acyl, aroyl which is unsubstituted or substituted by $(C_1-C_4)$-alkyl, $(C_1-C_4)$-alkoxy, sulfo, carboxyl or halogen, or has one of the meanings of $Z^{22}$; and n is 0 or 1;

in the general formula (I) at least one of $D^1$ and $D^2$ is a group of the general formula (1), where, if A is a group of the general formula (4), $R^1$ is aryl or substituted aryl and where the reactive dye of the general formula (I) contains at least one —$SO_2$-Z group.

DETAILED DESCRIPTION OF THE INVENTION

The individual symbols in the general formulae described above can be identical to or different from each other within the scope of their definitions.

$(C_1-C_4)$-alkyl R may be straight-chain or branched and is in particular methyl, ethyl, n-propyl, isopropyl, n-butyl, isobutyl, sec-butyl or tert-butyl. Methyl and ethyl are preferred. The same logic applies to $(C_1-C_4)$-alkoxy groups.

Aryl R is in particular phenyl. Substituted aryl $R^1$ is in particular phenyl substituted by one, two or three independent groups selected from the group consisting of $(C_1-C_4)$-alkyl, $(C_1-C_4)$-alkoxy, hydroxyl, sulfo, carboxyl, amido and halogen. Halogen R is in particular fluorine, chlorine or bromine, and fluorine and chlorine are preferred.

Alkali-eliminable $Z^1$ in the β-position of the ethyl group of Z include for example halogen atoms, such as chlorine and bromine, ester groups of organic carboxylic and sulfonic acids, as of alkylcarboxylic acids, substituted or unsubstituted benzenecarboxylic acids and substituted or unsubstituted benzenesulfonic acids, such as alkanoyloxy of 2 to 5 carbon atoms, especially acetyloxy, benzoyloxy, sulfobenzoyloxy, phenylsulfonyloxy and toluylsulfonyloxy, also acidic ester groups of inorganic acids, as of phosphoric acid, sulfuric acid and thiosulfuric acid (phosphato, sulfato and thiosulfato groups), similarly dialkylamino groups having alkyl groups of 1 to 4 carbon atoms in each case, such as dimethylamino and diethylamino.

Z is preferably vinyl, β-chloroethyl and particularly preferably β-sulfatoethyl.

The groups "sulfo", "carboxyl", "thiosulfato", "phosphate" and "sulfato" include not only their acid form but also their salt form. Accordingly, sulfo groups are groups conforming to the general formula —$SO_3M$, thiosulfato groups are groups conforming to the general formula —S—$SO_3M$, carboxyl groups are groups conforming to the general formula —COOM, phosphate groups are groups conforming to the general formula —$OPO_3M_2$ and sulfato groups are groups conforming to the general formula —$OSO_3M$, in each of which M is as defined above.

The dyes of the general formula (I) and (II) may possess different fiber-reactive groups —$SO_2Z$ within the meaning of Z. More particularly, the fiber-reactive groups —$SO_2Z$ may be on the one hand vinylsulfonyl groups and on the other —$CH_2CH_2Z^1$ groups, preferably β-sulfatoethylsulfonyl groups. If the dyes of the general formula (I) or (II) contain vinyl-sulfonyl groups in some instances, then the fraction of the respective dye with the vinylsulfonyl group is up to about 30 mol %, based on the respective amount of total dye.

Alkali M is in particular lithium, sodium or potassium. M is preferably hydrogen or sodium.

k is preferably 2 or 3.

$R^1$ to $R^{13}$ are each preferably hydrogen and $R^6$, $R^7$, $R^{12}$ and $R^{13}$ are each preferably sulfo as well.

If A is phenylene and $X^1$ is —$SO_2Z$, the bond leading to the $SO_2Z$-group preferably is in meta- or para-position of the nitrogen atom. In the general formula (1) the carbonamido-group preferably is in para- or meta-position of the diazo-group. If A is naphthylene, the bond leading to the nitrogen atom preferably is in β-position of the naphthylene-group. If $D^1$ or $D^2$ have one of the meanings of the general formula (6), the diazo-group preferably is in β-position of the naphthyl-group. If $D^1$ or $D^2$ have one of the meanings of the general formula (5) and $X^2$ is —$SO_2Z$, the bond leading to the $SO_2Z$-group preferably is in meta- or para-position of the diazo-group.

Examples of substituents A are in particular 1,2-phenylene, 1,3-phenylene, 1,4-phenylene, 2-chloro-1,4-phenylene, 2-chloro-1,5-phenylene, 2-bromo-1,4-phenylene, 2-sulfo-1,4-phenylene, 2-sulfo-1,5-phenylene, 2-methoxy-1,5-phenylene, 2-ethoxy-1,5-phenylene, 2,5-dimethoxy-1,4-phenylene, 2-methoxy-5-methyl-1,4-phenylene, 2-methyl-1,4-phenylene, 2,6-naphthylene, 2,8-naphthylene, 1-sulfo-2,6-naphthylene, 6-sulfo-2,8-naphthylene or 1,2-ethylene and 1,3-propylene.

A is particularly preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene or 1,2-ethylene and 1,3-propylene, and in the case of the two last-mentioned alkylene groups $R^1$ is preferably phenyl or 2-sulfophenyl.

Examples of groups $D^1$ and $D^2$ of general formulae (5) and (6) are 2-(β-sulfato-ethylsulfonyl)-phenyl, 3-(β-sulfatoethylsulfonyl)-phenyl, 4-(β-sulfatoethylsulfonyl)-phenyl, 2-carboxy-5-(β-sulfatoethylsulfonyl)-phenyl, 2-chloro-4-(β-sulfatoethyl-sulfonyl)-phenyl, 2-chloro-5-(β-sulfatoethylsulfonyl)-phenyl, 2-bromo-4-(β-sulfatoethylsulfonyl)-phenyl, 2-sulfo-4-(β-sulfatoethylsulfonyl)-phenyl, 2-sulfo-5-(β-sulfatoethylsulfonyl)-phenyl, 2-methoxy-5-(β-sulfatoethylsulfonyl)-phenyl, 2-ethoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 2-methyl-4-(β-sulfatoethylsulfonyl)-phenyl, 2- or 3- or 4-(β-thiosulfatoethylsulfonyl)-phenyl, 2-methoxy-5-(β-thiosulfatoethylsulfonyl)-phenyl, 2-sulfo-4-(β-phosphatoethylsulfonyl)-phenyl, 2-or 3- or 4-vinylsulfonyl-phenyl, 2-sulfo-4-vinylsulfonyl-phenyl, 2-chloro-4-(β-chloroethylsulfonyl)-phenyl, 2-chloro-5-(β-chloroethylsulfonyl)-phenyl, 3- or 4-(β-acetoxyethylsulfonyl)-phenyl, 6- or 8-(β-sulfatoethylsulfonyl)-naphth-2-yl, 6-(β-sulfatoethylsulfonyl)-1-sulfo-naphth-2-yl and 8-(β-sulfatoethylsulfonyl)-6-sulfo-naphth-2-yl, preferably 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl and 3- or 4-vinylsulfonyl-phenyl.

In general formula (II) $D^{21}$ is preferably 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 6-(β-sulfatoethylsulfonyl)-1-sulfo-naphth-2-yl, 3- or 4-vinylsulfonyl-phenyl, 1-sulfo-4-(2,4-difluoro-pyrimidin-6-yl)-amino-2-phenyl or 1-sulfo-4-(4,6-difluoro-pyrimidin-2-yl)-amino-2-phenyl, 2-sulfophenyl, 4-methyl-2-sulfophenyl or 1,5-disulfonaphth-2-yl, or a group of the general formula (1) with the preferred A, $R^1$ to $R^3$ and X as described above.

Examples of substituents $R^{21}$ in general formula (II) are hydrogen, methyl, ethyl, phenyl and sulfophenyl, where hydrogen and methyl are preferred.

In general formula (7) $R^{22}$ to $R^{24}$ are each preferably hydrogen and $R^{22}$, $R^{23}$ are each preferably sulfo as well.

In general formula (8) $R^{25}$ to $R^{27}$ are each preferably methyl or ethyl.

Anion $B^-$ preferably is sulfate or chloride.

In general formulae (12) and (13) $R^{2'}$ to $R^{4'}$ are preferably hydrogen or methyl, $R^{2'}$ is preferably phenyl as well and $R^{3'}$, $R^{4'}$ are each preferably 2-sulfoethyl, 2-, 3- or 4-sulfophenyl, 3- or 4-trimethylammoniumphenyl-sulfate, 3- or 4-trimethylammoniumphenyl-chloride as well, or $R^{3'}$ and $R^{4'}$ form a cyclic ring system which is preferably of the formula —(CH$_2$)$_2$—O—(CH$_2$)$_2$—.

W is preferably 1,3-phenylene, 1,4-phenylene, 2-sulfo-1,4-phenylene, 2-methoxy-1,5-phenylene, 2,5-dimethoxy-1,4-phenylene, 2-methoxy-5-methyl-1,4-phenylene, 1,2-ethylene, 1,3-propylene.

$Q^1$, $Q^2$ are independently of one another preferably chlorine, fluorine, cyanamido, carbamoylpyridino, carboxypyridino, or a group of the general formula (12) or (13) with the preferred $R^{2'}$ to $R^{4'}$, W and Z as described above.

Examples of the groups $Z^{21}$ and $Z^{22}$ are 2,4-dichloro-1,3,5-triazin-6-yl, 2-chloro-4-hydroxy-1,3,5-triazin-6-yl, 2-chloro-4-methoxy-1,3,5-triazin-6-yl, 2-chloro-4-phenoxy-1,3,5-triazin-6-yl, 2-chloro-4-(4-sulfophenoxy)-1,3,5-triazin-6-yl, 2-chloro-4-methylmercapto-1,3,5-triazin-6-yl, 4-amino-2-chloro-1,3,5-triazin-6-yl, 2-chloro-4-methylamino-1,3,5-triazin-6-yl, 2-chloro-4-morpholino-1,3,5-triazin-6-yl, 2-chloro-4-phenylamino-1,3,5-triazin-6-yl, 2-chloro-4-methylphenylamino-1,3,5-triazin-6-yl, 2-chloro-4-(2-sulfophenylamino)-1,3,5-triazin-6-yl, 2-chloro-4-(3-sulfophenylamino)-1,3,5-triazin-6-yl, 2-chloro-4-(4-sulfophenylamino)-1,3,5-triazin-6-yl, 2-chloro-4-(2,5-disulfophenylamino)-1,3,5-triazin-6-yl, 2-chloro-4-(3-trimethylammoniumphenylamino)-1,3,5-triazin-6-yl, 2-chloro-4-(4-trimethylammoniumphenylamino)-1,3,5-triazin-6-yl, 2-chloro-4-cyanamido-1,3,5-triazin-6-yl, 2-chloro-4-(2-sulfoethylamino)-1,3,5-triazin-6-yl, 2-chloro-4-(N-methyl-2-sulfoethylamino)-1,3,5-triazin-6-yl, 2-chloro-4-(3-carboxypyridino)-1,3,5-triazin-6-yl, 2-chloro-4-(4-carboxypyridino)-1,3,5-triazin-6-yl, 2-chloro-4-(3-carbamoylpyridino)-1,3,5-triazin-6-yl, 2-chloro-4-(4-carbamoylpyridino)-1,3,5-triazin-6-yl, 2-chloro-4-(2-(2-sulfatoethylsulfonyl)-phenylamino)-1,3,5triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(N-ethyl-4-(2-sulfatoethylsulfonyl)-phenylamino)-1,3,5-triazin-6-yl, 2-chloro-4-(2-carboxy-5-(2-sulfatoethylsulfonyl)-phenylamino)-1,3,5Striazin-6-yl, 2-chloro-4-(2-chloro-4-(2-sulfatoethylsulfonyl)-phenylamino)-1,3,5-triazin-6-yl, 2-chloro-4-(2-chloro-5-(2-sulfatoethylsulfonyl)-phenylamino)-1,3,5-triazin-6-yl, 2-chloro-4-(2-bromo-4-(2-sulfatoethylsulfonyl)-phenylamino)-1,3,5-triazin-6-yl, 2-chloro-4-(2-sulfo-4-(2-sulfatoethylsulfonyl.)-phenylamino)-1,3,5-triazin-6-yl, 2-chloro-4-(2-sulfo-5-(2-sulfatoethylsulfonyl)-phenylamino)-1,3,5-triazin-6-yl, 2-chloro-4-(2-methoxy-5-(2-sulfatoethylsulfonyl)-phenylamino)-1,3,5-triazin-6-yl, 2-chloro-4-(2,5-dimethoxy-4-(2-sulfatoethylsulfonyl)-phenylamino)-1,3,5-triazin-6-yl, 2-chloro-4-(2-methoxy-5-methyl-4-(2-sulfatoethylsulfonyl)-phenylamino )-1,3,5-triazin-6-yl, 2-chloro-4-(2-methyl-4-(2-sulfatoethylsulfonyl)-phenylamino )-1,3,5-triazin-6-yl, 2-chloro -4-(2-(vinyl sulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-4,3,5-triazin-6-yl, 2-chloro-4-(N-ethyl-4-(vinylsulfonyl)-phenylamino)-1,3,5-triazin-6-yl, 2-chloro-4-(6-(2-sulfatoethylsulfonyl)-naphth-2-ylamino )-1,3,5-triazin-6-yl , 2-chloro-4-(8-(2-sulfatoethylsulfonyl)-naphth-2-ylamino)-1,3,5-triazin-6-yl, 2-chloro-4-(8-(2-sulfatoethylsulfonyl)-6-sulfo-naphth-2-ylamino)-1,3,5-triazin-6-yl, 2-chloro-4-(3-(2-(2-sulfatoethylsulfonyl)-ethylcarbamoyl)-phenylamino)-1,3,5-triazin-6-yl, 2-chloro-4-(3-(2-(vinylsulfonyl)-ethylcarbamoyl)-phenylamino)-1,3,5-triazin-6-yl, 2-chloro-4-(4-(N-methyl-2-(2-sulfatoethylsulfonyl)-ethylcarbamoyl)-phenylamino)-1,3,5-triazin-6-yl, 2-chloro-4-(4-(N-phenyl-2-(2-sulfatoethylsulfonyl)-ethylcarbamoyl)-phenylamino)-1,3,5-triazin-6-yl, 2-chloro-4-(4-(3-(2-sulfatoethylsulfonyl)-phenylcarbamoyl)-phenylamino)-1,3,5-triazin-6-yl, 2-chloro-4-(4-(4-(2-sulfatoethylsulfonyl)-phenylcarbamoyl)-phenylamino)-1,3,5-triazin-6-yl, 2-chloro-4-(3-(3-(2-sulfatoethylsulfonyl)-phenylcarbamoyl)-phenylamino)-1,3,5-triazin-6-yl, 2-chloro-4-(3-(4-(2-sulfatoethylsulfonyl)-phenylcarbamoyl)-phenylamino)-1,3,5-triazin-6-yl, 2-chloro-4-(3-(2-sulfatoethylsulfonyl)-propylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-hydroxy-1,3,5-triazin-6-yl, 2-fluoro-4-methoxy-1,3,5-triazin-6-yl, 2-fluoro-4-phenoxy-1,3,5-triazin-6-yl, 2-fluoro-4-(4-sulfophenoxy)-1,3,5-triazin-6-yl, 2-fluoro-4-morpholino-1,3,5-triazin-6-yl, 2-fluoro-4-phenylamino-1,3,5-triazin-6-yl, 2-fluoro-4-methylphenylamino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(2,5-disulfophenylamino)-1,3,5-triazin-6-yl, 2-fluoro-4-(3-trimethylammoniumphenylamino)-1,3,5-triazin-6-yl, 2-fluoro-4-(4-trimethylammoniumphenylamino)-1,3,5-triazin-6-yl, 2-fluoro-4-(2-(2-sulfatoethylsulfonyl)-phenylamino)-1,3,5-triazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(N-ethyl-4-(2-sulfatoethylsulfonyl)-phenylamino)-1,3,5-triazin-6-yl, 2-fluoro-4-(2-carboxy-5-(2-sulfatoethylsulfonyl)-phenylamino)-1,3,5-triazin-6-yl, 2-fluoro-4-(2-chloro-4-(2-sulfatoethylsulfonyl)-phenylamino)-1,3,5-triazin-6-yl, 2-fluoro-4-(2-chloro-5-(2-sulfatoethylsulfonyl)-phenylamino)-1,3,5-triazin-6-yl, 2-fluoro-4-(2-bromo-4-(2-sulfatoethylsulfonyl)-phenylamino)-1,3,5-triazin-6-yl, 2-fluoro-4-(2-sulfo-4-(2-sulfatoethylsulfonyl)-phenylamino)-1,3,5-triazin-6-yl, 2-fluoro-4-(2-sulfo-5-(2-sulfatoethylsulfonyl)-phenylamino)-1,3,5-triazin-6-yl, 2-fluoro-4-(2-methoxy-5-(2-sulfatoethylsulfonyl)-phenylamino)-1,3,5-triazin-6-yl, 2-fluoro-4-(2,5-dimethoxy-4-(2-sulfatoethylsulfonyl)-phenylamino)-1,3,5-triazin-6-yl, 2-fluoro-4-(2-methoxy-5-methyl-4-(2-sulfatoethylsulfonyl)-phenylamino)-1,3,5-triazin-6-yl, 2-fluoro-4-(2-methyl-4-(2-sulfatoethylsulfonyl)-phenylamino)-1,3,5-triazin-6-yl, 2-fluoro-4-(2-(vinylsulfonyl)-phenylamino)-1,3,5-triazin-6-yl, 2-fluoro-4-(3-(vinylsulfonyl)-phenylamino)-1,3,5-triazin-6-yl, 2-fluoro-4-(4-(vinylsulfonyl)-phenylamino)-1,3,5-triazin-6-yl, 2-fluoro-4-(N-ethyl-4-(vinylsulfonyl)-phenylamino)-1,3,5-triazin-6-yl, 2-fluoro-4-(3-(2-(2-sulfatoethylsulfonyl)-ethylcarbamoyl)-phenylamino)-1,3,5-triazin-6-yl, 2-fluoro-4-(3-(2-(vinylsulfonyl)-ethylcarbamoyl)-phenylamino)-1,3,5-triazin-6-yl, 2-fluoro-4-(4-(N-methyl-2-(2-sulfatoethylsulfonyl)-ethylcarbamoyl)-phenylamino)-1,3,5-triazin-6-yl, 2-fluoro-4-(4-(N-phenyl-2-(2-sulfatoethylsulfonyl)-ethylcarbamoyl)-phenylamino)-1,3,5-triazin-6-yl, 2-fluoro-4-(4-(3-(2-sulfatoethylsulfonyl)-phenylcarbamoyl)-phenylamino)-1,3,5-triazin-6-yl, 2-fluoro-4-(4-(4-(2-sulfatoethylsulfonyl)-phenylcarbamoyl)-phenylamino)-1,3,5-triazin-6-yl, 2-fluoro-4-(3-(3-(2-sulfatoethylsulfonyl)-phenylcarbamoyl)-phenylamino)-1,3,5-triazin-6-yl, 2-fluoro-4-(3-(4-(2-sulfatoethylsulfonyl)-phenylcarbamoyl)-phenylamino)-1,3,5-triazin-6-yl, 2-fluoro-4-(3-(2-sulfatoethylsulfonyl)-propylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-di(4-(2-sulfatoethylsulfonyl)-phenylamino)-1,3,5-triazin-6-yl, 2,4-di(3-(2-sulfatoethylsulfonyl)-phenylamino)-1,3,5-triazin-6-yl, 2-(3-(2-sulfatoethylsulfonyl)-phenylamino)-4-(4-(2-sulfatoethylsulfonyl)-phenylamino)-1,3,5-triazin-6-yl, 2-(N-ethyl-4-(2-sulfatoethylsulfonyl)-phenylamino)-4-(4-(2-sufatoethylsulfonyl)-phenylamino)-1,3,5-triazin-6-yl , 2-(N-ethyl-4-(2-sulfatoethylsulfonyl)-phenylamino)-4-(3-(2-sulfatoethylsulfonyl)-phenylamino)-1,3,5-triazin-6-yl, 2-(N-ethyl-3-(2-sulfatoethylsulfonyl)-phenylamino)-4-(4-(2-sulfatoethylsulfonyl)-phenylamino)-1,3,5-triazin-6-yl, 2-(N-ethyl-3-(2-sulfatoethylsulfonyl)-phenylamino)-4-(3-(2-sulfatoethylsulfonyl)-phenylamino)-1,3,5-triazin-6-yl, 2,4-di(N-ethyl-4-(2-sulfatoethylsulfonyl)-phenylamino)-1,3,5-triazin-6-yl, 2,4-di(3-(vinylsulfonyl)-phenylamino)-1,3,5-triazin-6-yl, 2,4-di(4-(vinylsulfonyl)-phenylamino)- ,3,5-triazin-6-yl, 2,4-di(3-sulfophenylamino)-1,3,5-triazin-6-yl, 2,4-di(4-sulfophenylamino)-1,3,5-triazin-6-yl, 2-(3-carboxypyridino)-4-morpholino-1,3,5-triazin-6-yl, 2-(4-carboxypyridino)-4-(3-sulfophenylamino)-1 ,3,5-triazin-6-yl, 2-(3-carbamoylpyridino)-4-(2-sulfophenylamino)-1,3,5-triazin-6-yl, 2-(4-carbamoylpyridino)-4-(4-(2-sulfatoethylsulfonyl)-phenylamino)-1 ,3 ,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 4,5-difluoro-pyrimidin-6-yl, 5-chloro-4-fluoro-pyrimidin-6-yl, 2,4,5-trichloro-pyrimidin-6-yl, 4,5-dichloro-pyrimidin-6-yl, 2,4-dichloro-pyrimidin-6-yl, 4-fluoro-pyrimidin-6-yl, 4-chloro-pyrimidin-6-yl, 2,3-dichlorochinoxalin-6-carbonyl, and of $Z^{21}$ hydrogen, acetyl and benzoyl as well.

Preferably the groups $Z^{21}$ and $Z^{22}$ are 2,4-dichloro-1,3,5-triazin-6-yl, 2-chloro-4-morpholino-1,3,5-triazin-6-yl, 2-chloro-4-(3-sulfophenylamino)-1,3,5-triazin-6-yl, 2-chloro-4-(4-sulfophenylamino)-1,3,5-triazin-6-yl, 2-chloro-4-cyanamido-1,3,5-triazin-6-yl, 2-chloro-4-(N-methyl-2-sulfoethylamino)-1,3,5-triazin-6-yl, 2-chloro-4-(3-carboxypyridino)-1,3,5-triazin-6-yl, 2-chloro-4-(4-carboxypyridino)-1,3,5-triazin-6-yl, 2-chloro-4-(3-carbamoylpyridino)-1,3,5-triazin-6-yl, 2-chloro-4-(4-carbamoylpyridino)-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-morpholino-1,3,5-triazin-6-yl, 2-fluoro-4-(2-sulfophenylamino)-1 ,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(3-trimethylammoniumphenylamino)-1,3,5-triazin-6-yl, 2-fluoro-4-(4-trimethylammoniumphenylamino)-1,3, Sriazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(3-(vinylsulfonyl)-phenylamino)-1,3,5-triazin-6-yl, 2-fluoro-4-(4-(vinylsulfonyl)-phenylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 2,3-dichlorochinoxalin-6-carbonyl, and $Z^{21}$ preferably acetyl as well.

Most preferably the groups $Z^{21}$ and $Z^{22}$ are 2,4-dichloro-1,3,5-triazin-6-yl, 2-chloro-4-morpholino-1,3,5-triazin-6-yl, 2-chloro-4-(3-sulfophenylamino)-1,3,5-triazin-6-yl, 2-chloro-4-(4-sulfophenylamino)-1,3,5-triazin-6-yl, 2-chloro-4-cyanamido-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-morpholino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro4-(3-trimethylammoniumphenylamino)-1,3,5-triazin-6-yl, 2-fluoro-4-(4-trimethylammoniumphenylamino)-1,3,5-triazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(3-(vinylsulfonyl)-phenylamino)-1,3,5-triazin-6-yl, 2-fluoro-4-(4-(vinylsulfonyl)-phenylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 2,3-dichlorochinoxalin-6-carbonyl, and $Z^{21}$ preferably acetyl as well.

n is preferably 0.

In general formula (II) the bond leading to the nitrogen atom preferably is in β-position of the naphthalene. If $D^{21}$ has one of the meanings of the general formula (6), the diazo-group preferably is in β-position of the naphthyl-group. If $D^{21}$ has one of the meanings of the general formula (5) and $X^2$ is —SO$_2$Z, the bond leading to the SO$_2$Z-group preferably is in meta- or para-position of the diazo-group. If $D^{21}$ has one of the meanings of the general formula (8), the quaternary-salt preferably is in meta- or para-position of the diazo-group.

Preferred dye mixtures comprise one or more compounds of the general formula (Ia)

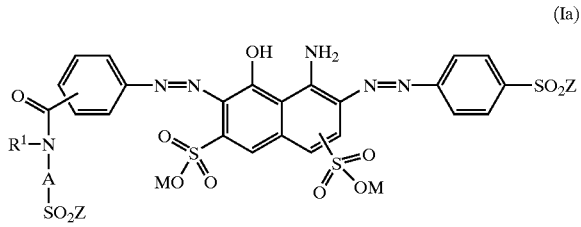

(Ia)

and one or more compounds of the general formula (IIa)

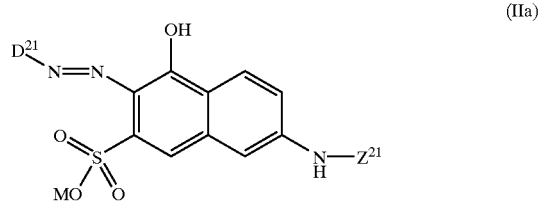

(IIa)

In the general formulae (Ia) and (IIa) M, A, $R^1$, Z, $D^{21}$ and $Z^{21}$ are each as defined above.

Particularly preferably, A is phenylene and Z is vinyl or β-sulfatoethyl in the general formula (Ia).

Most preferably, A is phenylene, $R^1$ is hydrogen and Z is vinyl or β-sulfatoethyl in the general formula (Ia).

In general, the azo dyestuffs of the formula (I) are contained in the mixture in quantity of 95 to 30% by weight and the azo dyestuffs of the formula (II) are contained in the mixture in a mixing ratio of 10 to 70% by weight, preferably in a mixing ration of 90%:10% by weight to 40%:60% by weight.

The dye mixtures according to the present invention may also comprise one or more red monoazo dye of the general formulae (14) or (15) in up to 10% by weight

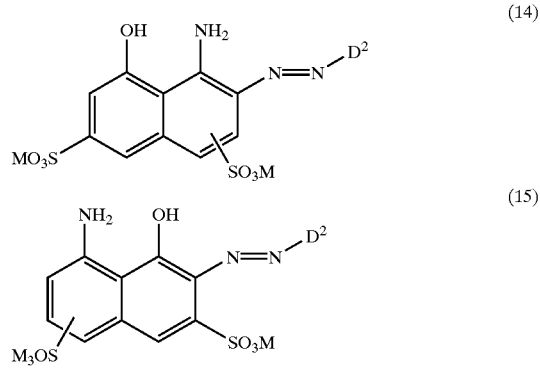

where M and $D^2$ are each as defined above. Particularly preferably $D^2$ is 4-(2-sulfatoethylsulfonyl)-phenyl or 4-vinylsulfonyl-phenyl. The dyes of the formulae (14) and (15) can be synthesised by the standard methology, or are partly formed during the synthesis of compound (I). They are generally added as shading components.

Dyestuffs of formula (I) are known from EP-A-1046677 and dyestuffs of formula (II) are well known from KR 84-2785, EP-A-08311, DE-A-3915305, U.S. Pat. No. 5,349,057, WO 9963005-A1, EP-B-0557841, EP-B-0808343, U.S. Pat. No. 823,926, DE-A-1 265 698, DE-A-19 43 904, FR 2 019 394,CA-A-519 978.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also assistants customary in commercial dyes, such as buffer substances capable of establishing a pH in aqueous solution between 3 and 7, such as sodium acetate, sodium borate, sodium bicarbonate, sodium citrate, sodium dihydrogen-phosphate and disodiumhydrogenphosphate, small amounts of siccatives or if, they are present in liquid, aqueous solution (including the presence of thickeners of the type customary in print pastes), substances which ensure the permanence of these preparations, for example mold pre-ventatives.

In general, the dye mixtures will take the form of dye powders containing from 10 to 80% by weight, based on the dye powder or preparation, of a strength-standardizing col-orless diluent electrolyte salt. These dye powders may in addition contain the abovementioned buffer substances in a total amount of up to 10%, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The dye mixtures of this invention can be obtained in a conventional manner, for instance by mechanically mixing the individual dyes in solid form or in form of aqueous solutions in the required proportions, or by synthesis by means of the customary diazotization and coupling reactions using appropriate mixtures of a diazo and the coupling components in a manner familiar to those skilled in the art and the necessary proportions.

Thus, if the diazo components with the groups $D^1$ and $D^{21}$ according to the general formulae (I) and (II) are the same ($D^1$=$D^{21}$), one option is for example to prepare aqueous suspensions of a mixture of a red monoazo dye according to the general formula (14) with the meanings of M and $D^2$ described above, and an optionally N-substituted 2-Amino-7-sulfo-5-naphthol or 2-Amino-6-sulfo-8-naphthol as cou-pling components, then coupling in a one-pot reaction with a diazotised aniline or naphthylamine compound of the formula $D^1$-NH$_2$, with the meanings of $D^1$ described above, at a pH between 4 and 8 forming a mixture of disazo dyes conforming to the formula (I) and monoazo dyes conform-ing to the formula (II). The final dyestuff can be isolated from the solution in the conventional manner, for example by salting out with an electrolyte salt, such as sodium chloride or potassium chloride, or by spray-drying.

The red monoazo-dyes of general formulae (14) can be prepared by diazotizing an amino compound $D^2$-NH$_2$, with the meanings of $D^2$ described above, in a conventional manner in a strongly acid medium and then carrying out the first coupling reaction of 1-amino-8-naphthol-3,6-disulfonic acid or 1-amino-8-naphthol-4,6-disulfonic acid with the diazo component at a pH below 2.

Dye mixtures in which the dye chromophores contain for example not only a β-chloroethylsulfonyl or 9-thiosulfatoethylsulfonyl or β-sulfatoethylsulfonyl group but also proportions with vinylsulfonyl groups cannot only be prepared by the above mentioned method using appropriate vinylsulfonyl starting anilines or naphthylamines, but also by reacting the dye mixture in which Z is a β-chloroethyl, β-thiosulfatoethyl, or β-sulfatoethyl group with an amount of alkali required for only part of these groups and converting partly said β-substituted ethylsulfonyl groups into vinylsulfonyl groups. This procedure is carried out by generally known methods of converting β-substituted ethylsulfonyl groups into the vinylsulfonyl group.

The solution of the dye mixtures according to the invention obtained during synthesis of their individual azo dyes can also be used for dyeing directly as a liquid preparation, if appropriate after addition of a buffer substance and if appropriate also after concentration or dilution.

The reactive dye mixtures according to the invention have fiber-reactive properties and possess very good dye properties. They can therefore be used for dyeing hydroxyl- and/or carboxamido-containing material, especially fiber material, paper and also leather.

The present invention therefore also provides for the use of the inventive dye mixtures for dyeing or printing hydroxyl- and/or carboxamido-containing materials, or methods for their application on these substrates. This includes mass coloration, for example films composed of polyamide, and printing. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The inventive reactive dye mixtures can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good color yields and excellent color build-up combined with high fixation yields. Dyeing is carried out in an aqueous bath at temperatures between 40 and 105° C., optionally at temperatures of up to 120° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the inventive reactive dye mixtures may also, if desired, only be added to the bath after the actual dyeing temperature has been reached.

However, the inventive reactive dye mixtures are also very useful for saltless or low-salt dyeing and can thus be dyed for example without any salt at low depth of shade, with very little salt such as not more than 5 g/l electrolyte salt at medium depth of shade and with not more than 10 g/l electrolyte salt at higher depths of shade, and in all cases strong dyeings are obtained.

Low depths of shade for the purposes of this invention are depths of shade involving not more than 2 percent by weight of dye being used, based on the substrate. Medium depths of shade are to be understood as meaning more than 2 to not more than 4 percent by weight of dye and higher depths of shade are to be understood as meaning more than 4 to not more than 10 percent by weight of dye, based on the substrate.

This provides for partly distinct reductions not only of the effluent loading of dyehouse wastewaters but also of the associated costs.

The padding process likewise provides excellent color yields coupled with high fixation yields and very good color build-up on cellulose fibers, the dye mixture being allowed to become fixed on the material by batching at room temperature or at elevated temperature, for example at up to approximately 60° C., by steaming or using dry heat in a conventional manner.

Similarly, the customary printing processes for cellulose fibers, which can be carried out either single-phase, for example by printing with a print paste comprising sodium carbonate or some other acid-binding agent and a reactive dye-mixture of the invention and by subsequent steaming at 100 to 103° C., or two-phase, for example by printing with print paste comprising a neutral or weakly acidic print colour and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The outcome of the prints is not greatly affected by variations in the fixing conditions.

The fixation yields obtained with the inventive reactive dye mixtures are very high not only in dyeing but also in printing.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the inventive reactive dye mixtures on the cellulose fibers include for example water-soluble basic salts of the alkali metals and the alkaline earth metals of inorganic or organic acids and likewise compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium-hydroxide, sodium carbonate, sodium bicarbonate, potassium carbonate, sodium formate, sodium dihydrogenphosphate, disodium hydrogenphosphate, sodium trichloroacetate, waterglass or trisodium phosphate. Treating the inventive dye mixtures with the acid-binding agents with or without heating, binds the dyes chemically to the cellulose fiber. Cellulose dyeings in particular, following the customary aftertreatment by rinsing to remove unfixed dye portions exhibit very good wet fastnesses, in particular since such unfixed dye portions are easily washed off on account of their good solubility in cold water.

Dyeings on polyurethane and polyamide fibers are customarily carried out from an acidic medium. For instance, the dyebath may include acetic acid and/or ammonium sulfate and/or acetic acid and ammonium acetate or sodium acetate in order to obtain the desired pH. To achieve useful levelness for the dyeing, it is advisable to add customary leveling aids, for example based on a reaction product of cyanuric chloride with three times the molar amount of an aminobenzenesulfonic acid and/or an aminonaphthalenesulfonic acid or based on a reaction product of for example stearylamine with ethylene oxide. Generally the material to be dyed is introduced into the bath at a temperature of about 40° C., agitated therein for some time, and the dyebath is then adjusted to the desired weakly acidic pH, preferably with acetic acid, and the actual dyeing is carried out at a temperature between 60 and 98° C. However, the dyeings can also be carried out at boiling point or at temperatures of up to 120° C. (under pressure).

The dyeings and prints on cellulose fiber materials in particular, as already mentioned, have high color strength, good light- and wet fastnesses and also good hot press and crock fastnesses. Particularly noteworthy are the high yields of fixation obtainable on cellulose fiber materials, which can be above 90%, and also the very good color build-up, including the exhaust method using reduced neutral salt quantities or dispensing with salt altogether, depending on the depth of shade, i.e., depending on the amount of dye used. A further advantage of the inventive reactive dye mixtures is the ease with which portions unfixed in the printing or dyeing process are washed off, as a result of which the wash of the printed or dyed cellulose fiber materials can be accomplished with smaller amounts of wash liquor and, as the case may be, energy-saving temperature control during the wash.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of the sodium salts as in general they are prepared and isolated in the form of their alkali metal salts, such as lithium, sodium or potassium salts, and used for dyeing in the form of this salts. The starting compounds and components mentioned in the form of the free acid in the examples hereinbelow may be used in the synthesis as such or similarly in the form of their salts, preferably alkali metal salts.

EXAMPLE 1

85 parts of an electrolyte-containing dye powder which contains the navy-dyeing disazo dye of the formula (IA)

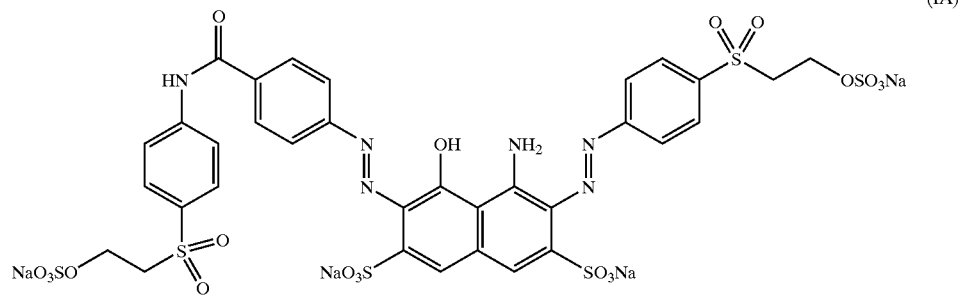

(IA)

in a proportion of 70% are mechanically mixed with 15 parts of an electrolyte-containing dye powder which contains the orange-dyeing monoazo dye of the formula (IIA) in a 75% proportion

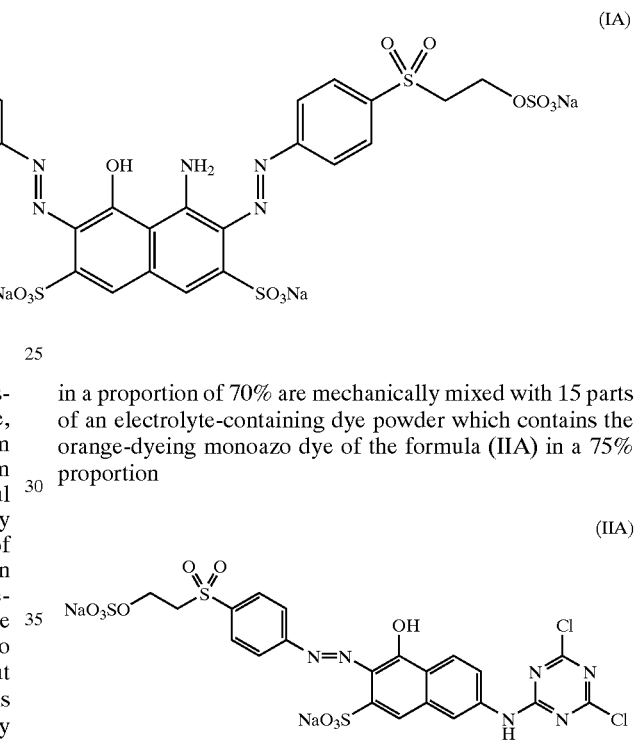

(IIA)

The resulting dye mixture according to the invention, when employed according to the application and fixing methods customary in the art for fiber-reactive dyes, produces for example on cellulose fiber materials dyeings and prints in deep black shades.

EXAMPLE 2

80 parts of an electrolyte-containing dye powder which contains the navy-dyeing disazo dye of the formula (IA) in a proportion of 75% and 20 parts of an electrolyte-containing dye powder which contains the orange-dyeing monoazo dye of the formula (IIA) in a 60% proportion are dissolved in 700 parts of water and the resulting dye solution is adjusted to pH 5.5–6.5. Evaporating this solution affords a dye mixture which produces deep black shades on cellulosic materials when employed according to the application and fixing methods customary in the art for fiber-reactive dyes.

EXAMPLE 3 a) A suspension of 281 parts of 4-(β-sulfatoethylsulfonyl)-aniline in 650 parts of ice-water and 180 parts of 30% aqueous hydrochloric acid is diazotized with 173 parts of 40% strength aqueous sodium nitrite solution. 319 parts of 1-amino-8-napthol-3,6-disulfonic acid are added and the first coupling forming a red monoazo dye according to the general formula (14) is carried out at a pH between 1 and 1.3 and at a temperature below 20° C. During the reaction the pH is maintained with about 140 parts of sodium bicarbonate.

b) In a separate vessel to a suspension of 500 parts of 4-amino-N-(3-(β-sulfatoethylsulfonyl)-phenyl)-benzamide in 2750 parts of ice-water, adjusted to pH 6.5–7 with about 90 parts of sodium carbonate, are added 217 parts of 40% strength aqueous sodium nitrite solution. This suspension is pumped into a slurry of 780 parts of ice, 630 parts ice-water and 450 parts concentrated hydrochloric acid. After stirring for 2 hours at 5–10° C. excess nitrite is destroyed using sulfamic acid and the resulting diazo suspension is pumped into solution (a). Immediately afterwards 70 parts of 6-acetylamino-1-hydroxynaphthalene-3-sulfonic acid are added to the reaction mixture. The pH is raised to 5–6 by addition of sodium carbonate at a temperature below 25° C. and after the coupling is complete the 85:15 mixture of the dyes (IB) and (IIB) is isolated by spray-drying.

Alternatively the obtained dye solution can be buffered at pH 5.5–6 by adding a sodium phosphate buffer. By further diluting with water or by evaporating the solution, this liquid dye mixture can then be standardized to the desired strength for a liquid preparation.

The dye mixture affords deep black shades on cellulosic materials.

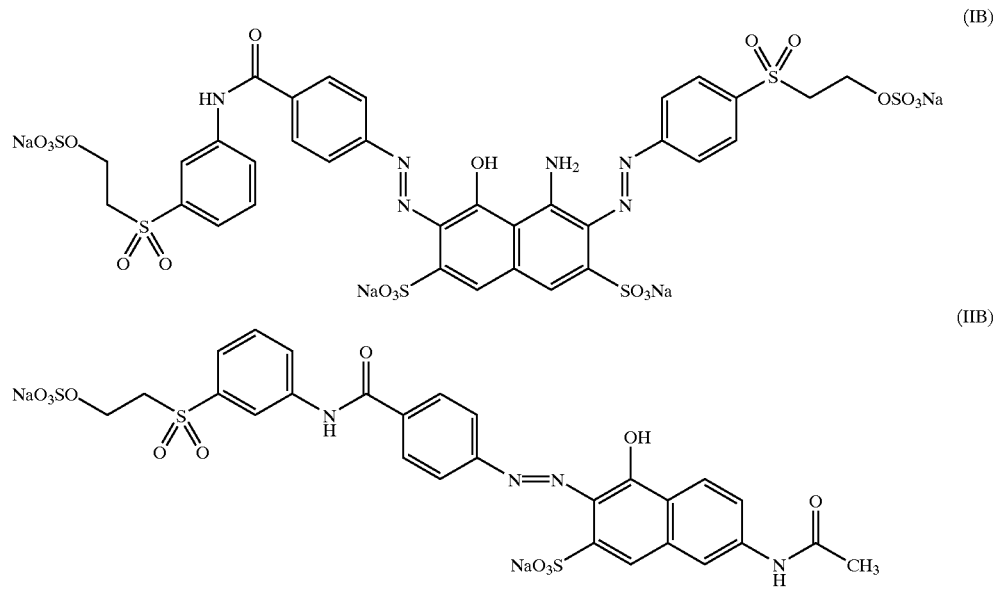

(IB)

(IIB)

EXAMPLES 4 TO 634

The table examples which follow describe further dye mixtures according to the invention of the dyes conforming to the formulae (I) and (II) as the sodium salts and the mixing ratios of the dyes by percent by weight. When employed according to the application and fixing methods customary in the art for fiber-reactive dyes, these dye mixtures produce, for example, on cellulose fiber materials, navy to deep black dyeings.

Dye mixtures prepared according to Example 1 or 2

| Example | Dye of general formula (I) | Dye of general formula (II) | ratio of dyes (I):(II) |
|---|---|---|---|
| 4 | (IA) | (IIC) | 75:25 |

| Example | Dye of general formula (I) | Dye of general formula (II) | ratio of dyes (I):(II) |
|---|---|---|---|
| 5 | (IA) | (IID) | 80:20 |
| 6 | (IA) | (IIE) | 80:20 |
| 7 | (IA) | (IIF) | 80:20 |
| 8 | (IA) | (IIG) | 80:20 |
| 9 | (IA) | (IIH) | 85:15 |
| 10 | (IA) | (IIJ) | 80:20 |

-continued
| Example | Dye of general formula (I) | Dye of general formula (II) | ratio of dyes (I):(II) |
|---|---|---|---|
| 11 | (IA) | (IIK) 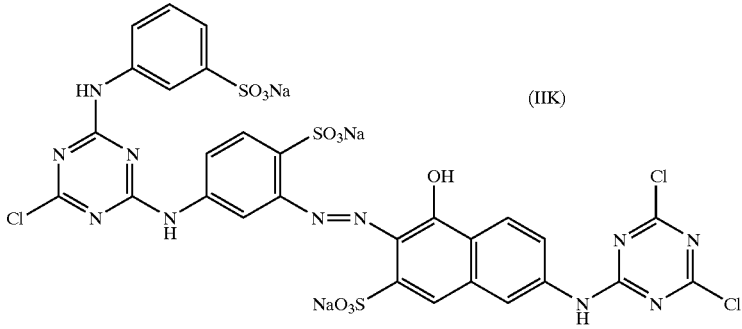 | 85:15 |
| 12 | (IA) | (IIL) 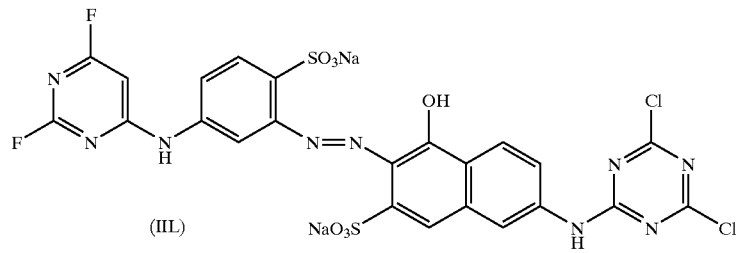 | 85:15 |
| 13 | (IA) | (IIM) 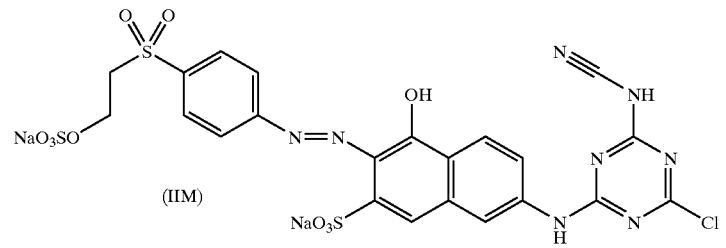 | 75:25 |
| 14 | (IA) | (IIN) 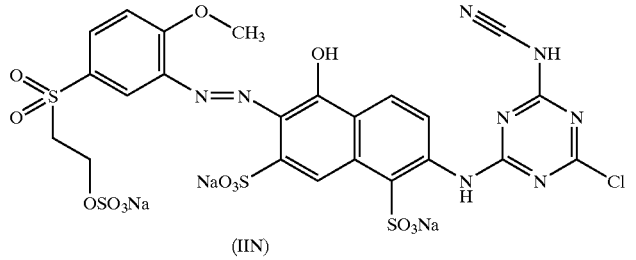 | 70:30 |
| 15 | (IA) | (IIP) 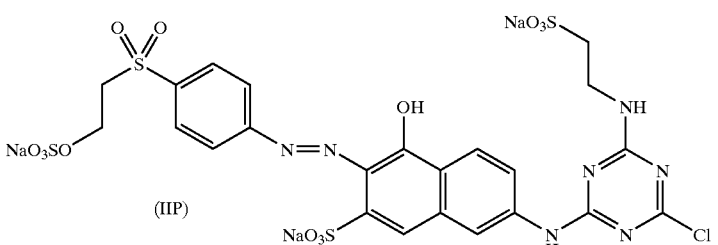 | 75:25 |

-continued

| Example | Dye of general formula (I) | Dye of general formula (II) | ratio of dyes (I):(II) |
|---|---|---|---|
| 16 | (IA) | (IIQ) | 70:30 |
| 17 | (IA) | (IIR) | 80:20 |
| 18 | (IA) | (IIS) | 80:20 |
| 19 | (IA) | (IIT) | 70:30 |
| 20 | (IA) | (IIU) | 75:25 |

-continued
| Example | Dye of general formula (I) | Dye of general formula (II) | ratio of dyes (I):(II) |
|---|---|---|---|
| 21 | (IA) | (IIW) 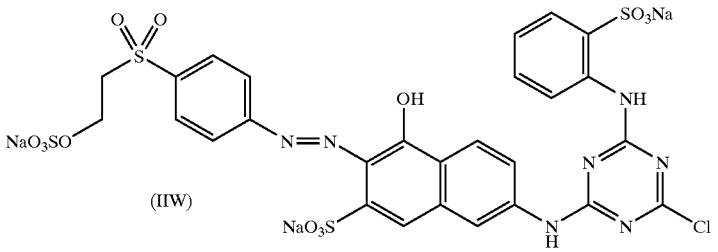 | 80:20 |
| 22 | (IA) | (IIY) 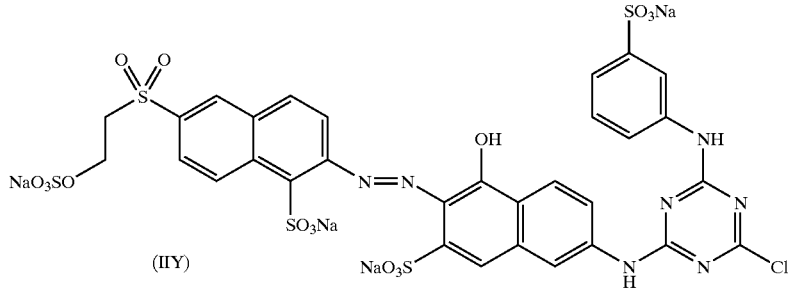 | 80:20 |
| 23 | (IA) | (IIZ) 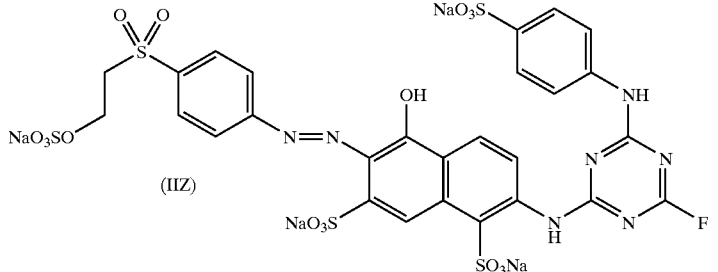 | 70:30 |
| 24 | (IA) | (IIAA) 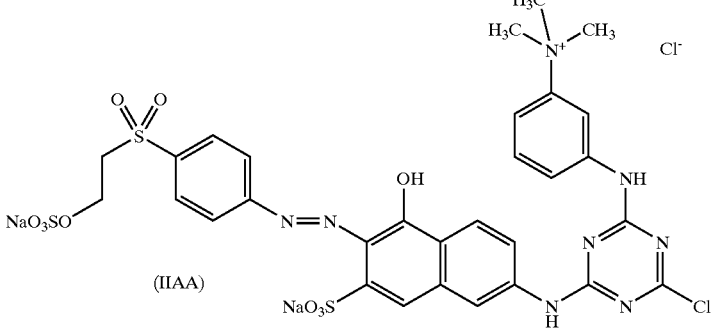 | 85:15 |

-continued
| Example | Dye of general formula (I) | Dye of general formula (II) | ratio of dyes (I):(II) |
|---|---|---|---|
| 25 | (IA) | (IIAB) 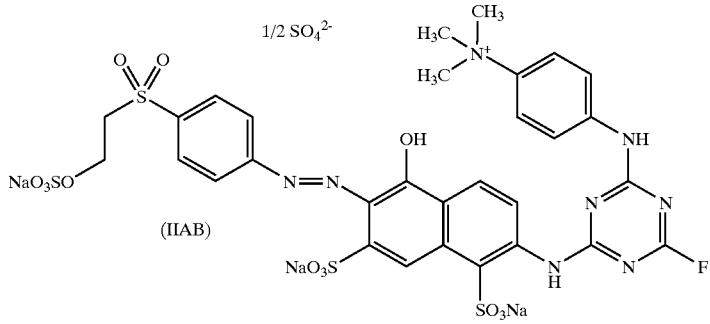 | 80:20 |
| 26 | (IA) | (IIAC) 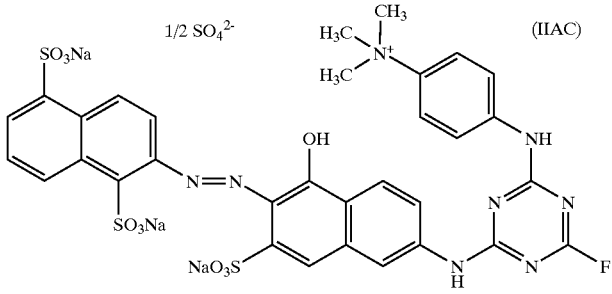 | 80:20 |
| 27 | (IA) | (IIAD) 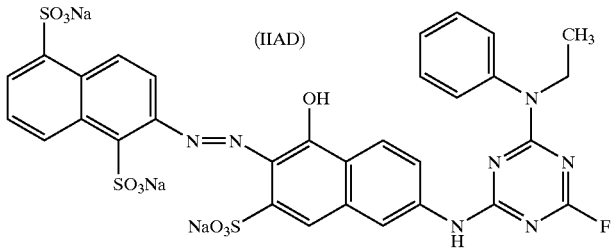 | 80:20 |
| 28 | (IA) | (IIAE) 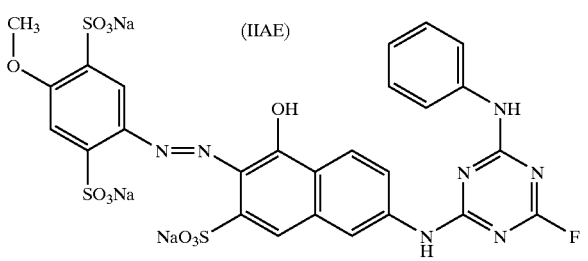 | 80:20 |
| 29 | (IA) | (IIAF) 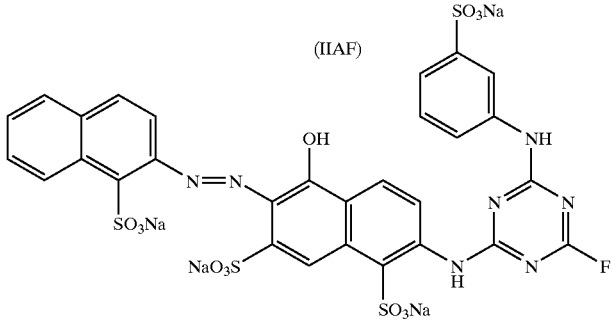 | 75:25 |

| Example | Dye of general formula (I) | Dye of general formula (II) | ratio of dyes (I):(II) |
|---|---|---|---|
| 30 | (IA) | (IIAG) | 80:20 |
| 31 | (IA) | (IIAH) | 80:20 |
| 32 | (IA) | (IIAJ) | 85:15 |
| 33 | (IA) | (IIAK) | 80:20 |

-continued
| Example | Dye of general formula (I) | Dye of general formula (II) | ratio of dyes (I):(II) |
|---|---|---|---|
| 34 | (IA) | (IIAL) 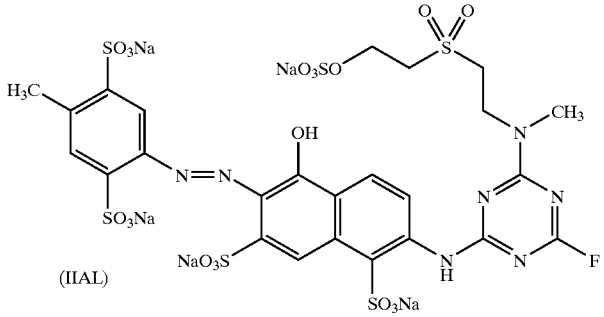 | 70:30 |
| 35 | (IA) | (IIAM) 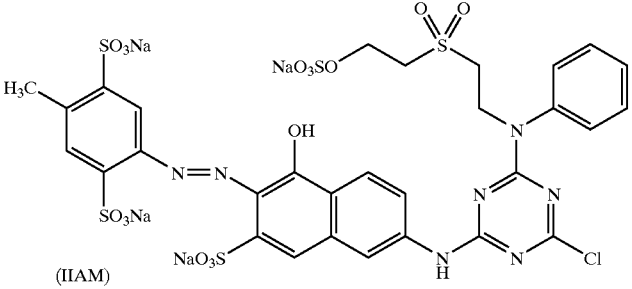 | 75:25 |
| 36 | (IA) | (IIAN) 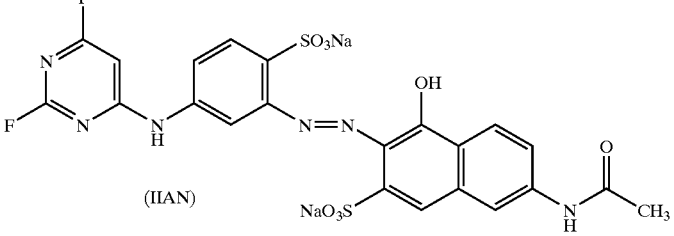 | 75:25 |
| 37 | (IA) | (IIAP) 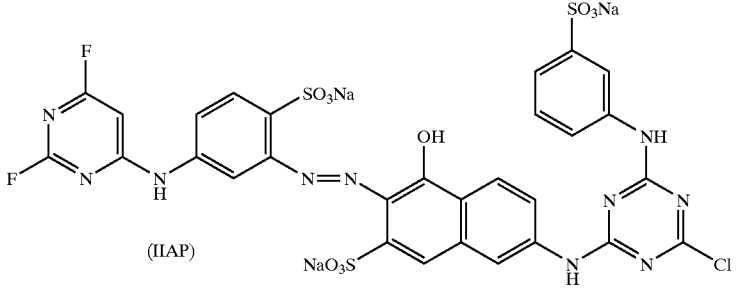 | 80:20 |
| 38 | (IA) | (IIAQ) 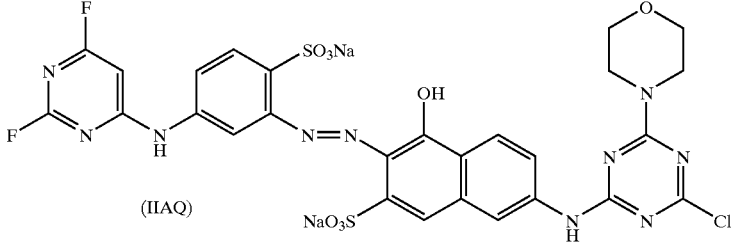 | 80:20 |

-continued
| Example | Dye of general formula (I) | Dye of general formula (II) | ratio of dyes (I):(II) |
|---|---|---|---|
| 39 | (IA) | 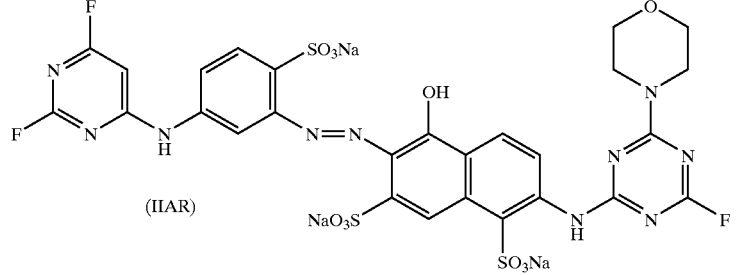 (IIAR) | 70:30 |
| 40 | (IA) | 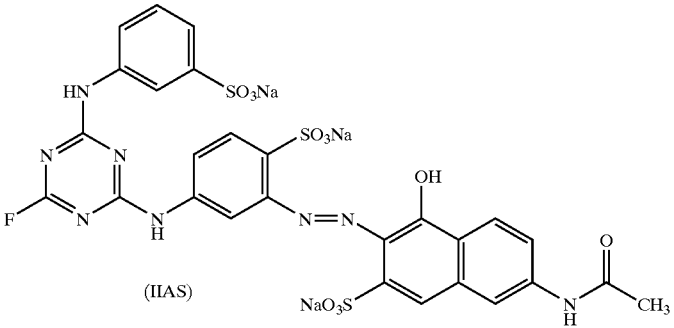 (IIAS) | 75:25 |
| 41 | (IA) | 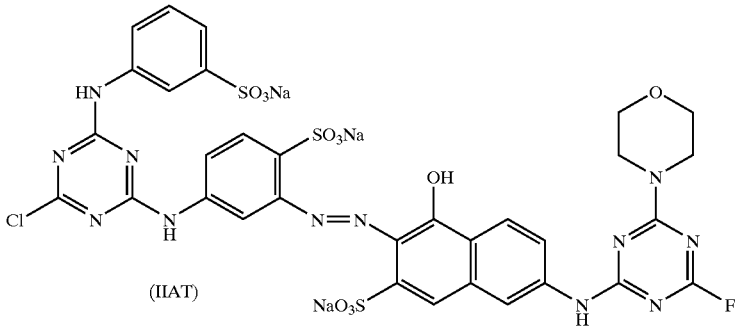 (IIAT) | 80:20 |
| 42 | (IA) | 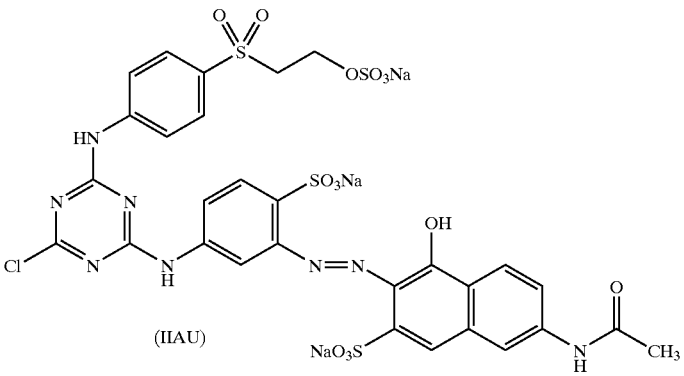 (IIAU) | 80:20 |

-continued
| Example | Dye of general formula (I) | Dye of general formula (II) | ratio of dyes (I):(II) |
|---|---|---|---|
| 43 | (IA) | (IIAW) 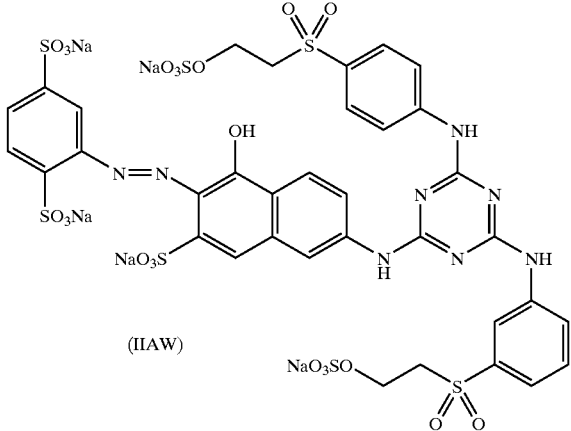 | 80:20 |
| 44 | (IA) | (IIAY) 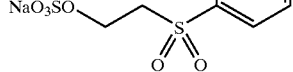 | 80:20 |
| 45 | (IA) | (IIAZ) 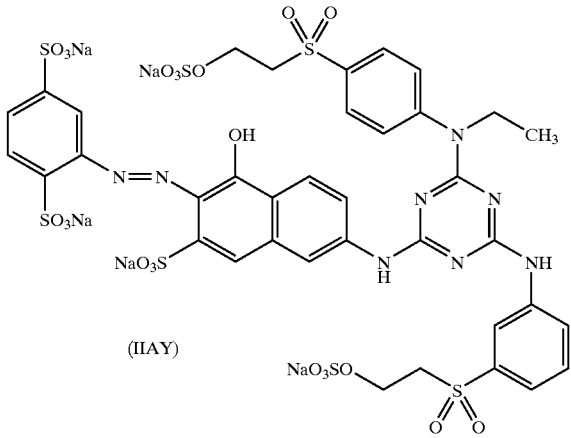 | 80:20 |

-continued

| Example | Dye of general formula (I) | Dye of general formula (II) | ratio of dyes (I):(II) |
|---|---|---|---|
| 46 | (IA) | (IIBA) | 80:20 |
| 47 | (IA) | (IIBB) | 75:25 |
| 48 | (IA) | (IIBC) | 80:20 |
| 49 | (IA) | (IIBD) | 80:20 |

| Example | Dye of general formula (I) | Dye of general formula (II) | ratio of dyes (I):(II) |
|---|---|---|---|
| 50 | (IA) | 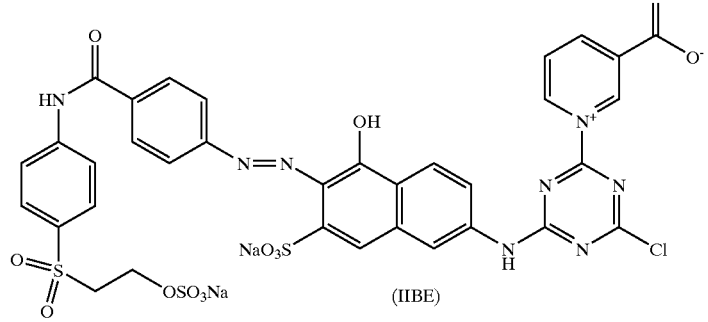 (IIBE) | 80:20 |
| 51 | (IA) | 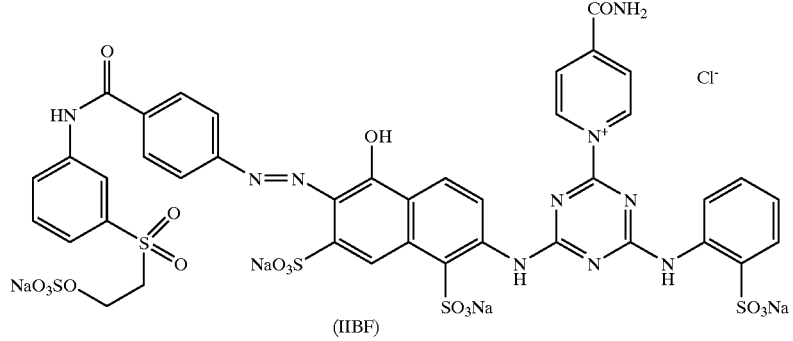 (IIBF) | 75:25 |
| 52 | (IA) | 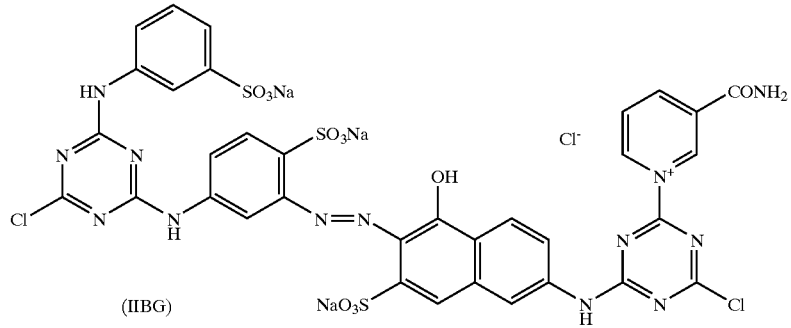 (IIBG) | 80:20 |
| 53 | (IA) | 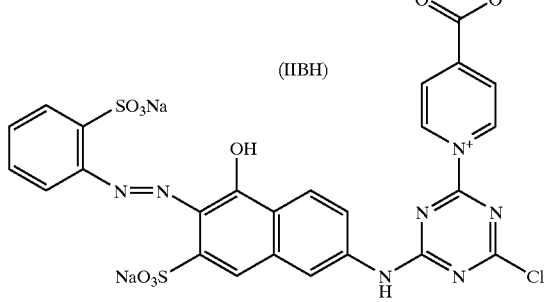 (IIBH) | 75:25 |

-continued
| Example | Dye of general formula (I) | Dye of general formula (II) | ratio of dyes (I):(II) |
|---|---|---|---|
| 54 | (IA) | (IIBJ) 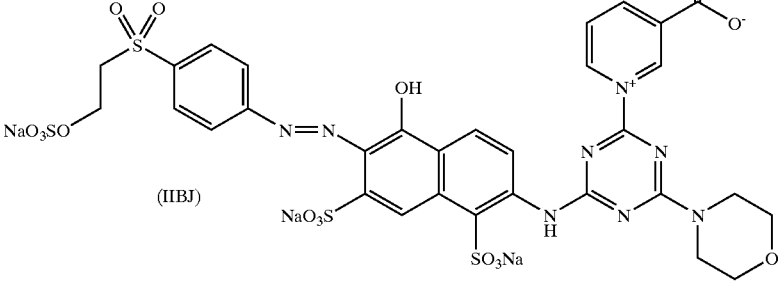 | 75:25 |
| 55 | (IA) | (IIBK) 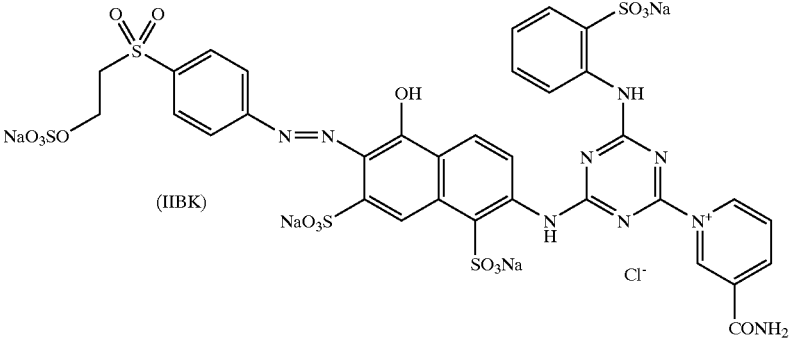 | 75:25 |
| 56 | (IA) | (IIBL) 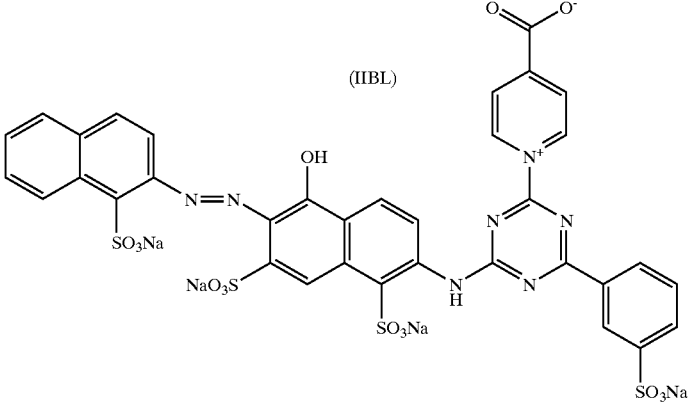 | 70:30 |
| 57 | (IA) | (IIBM) 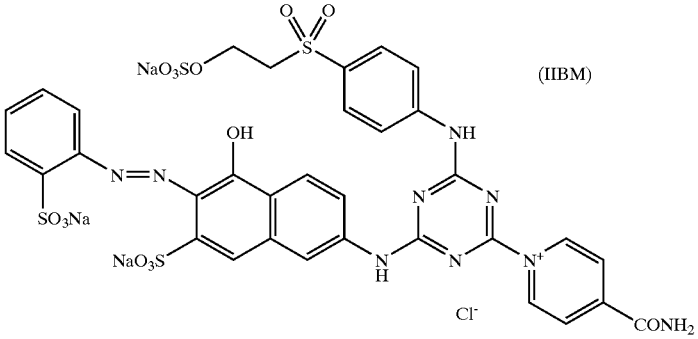 | 80:20 |

-continued
| Example | Dye of general formula (I) | Dye of general formula (II) | ratio of dyes (I):(II) |
|---|---|---|---|
| 58 | (IA) | (IIBN) 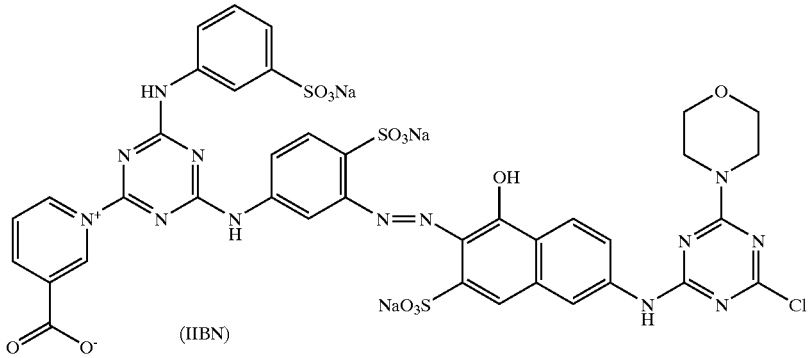 | 75:25 |
| 59 | (IA) | (IIBP) 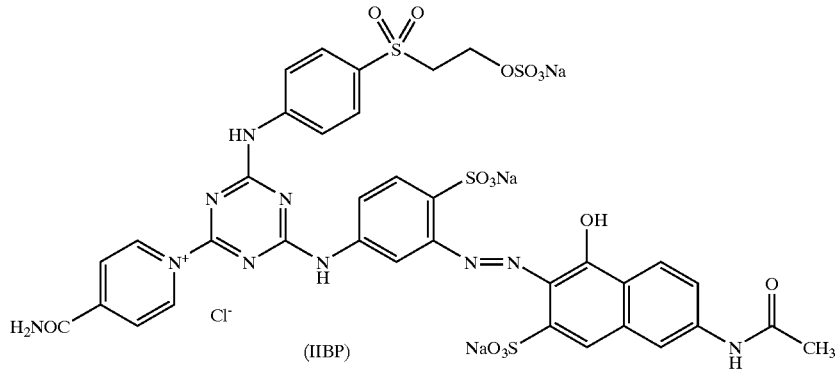 | 80:20 |
| 60 | (IA) | (IIBQ) 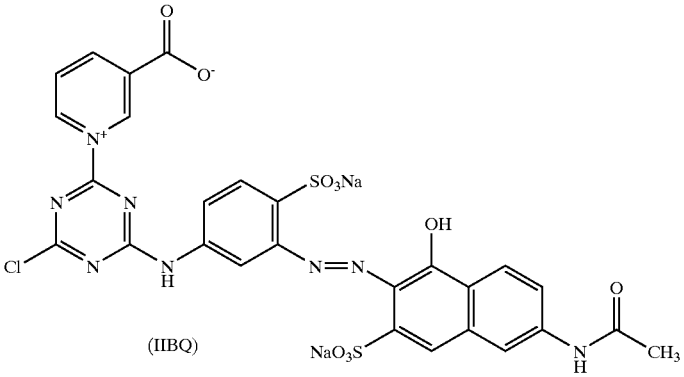 | 70:30 |
| 61 | (IA) | (IIBR) 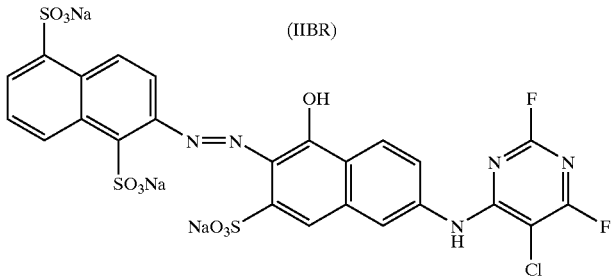 | 80:20 |

-continued
| Example | Dye of general formula (I) | Dye of general formula (II) | ratio of dyes (I):(II) |
|---|---|---|---|
| 62 | (IA) | (IIBS) 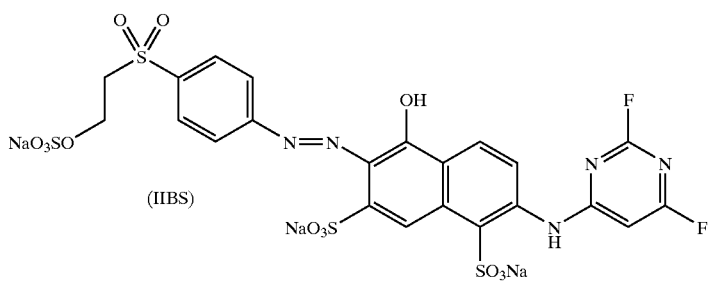 | 75:25 |
| 63 | (IA) | (IIBT) 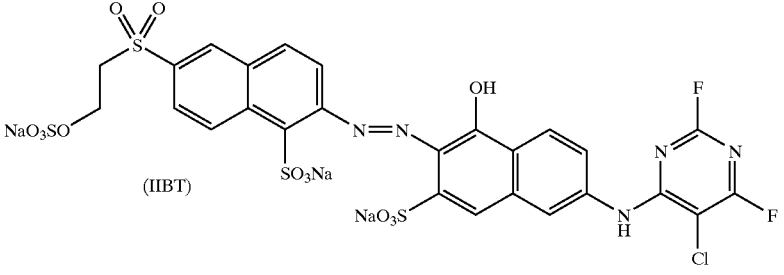 | 85:15 |
| 64 | (IA) | (IIBU) 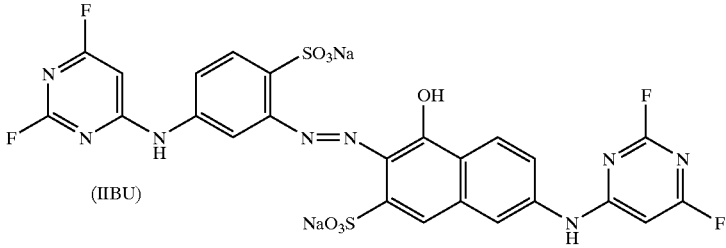 | 80:20 |
| 65 | (IA) | (IIBW) 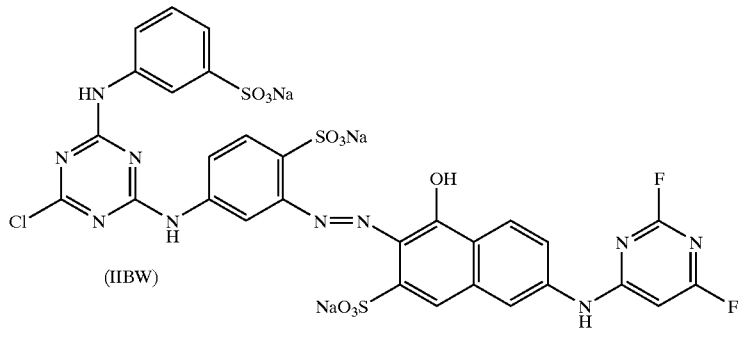 | 75:25 |
| 66 | (IA) | (IIBY) 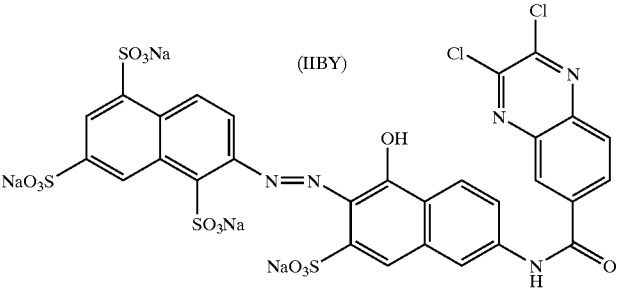 | 65:35 |

-continued

| Example | Dye of general formula (I) | Dye of general formula (II) | ratio of dyes (I):(II) |
|---|---|---|---|
| 67 | (IA) | (IIBZ) | 80:20 |
| 68 | (IA) | (IICA) | 75:25 |
| 69 | (IA) | (IICB) | 85:15 |
| 70 | (IA) | (IICC) | 75:25 |
| 71 | (IA) | (IICD) | 70:30 |

-continued
| Example | Dye of general formula (I) | Dye of general formula (II) | ratio of dyes (I):(II) |
|---|---|---|---|
| 72 | (IA) | 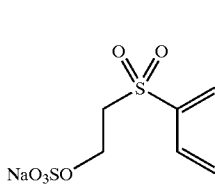 (IICE) | 80:20 |
| 73 | (IA) | 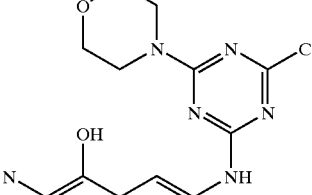 (IICF) | 80:20 |
| 74 | (IA) | 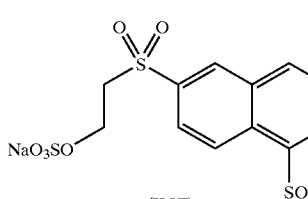 (IICG) | 80:20 |
| 75 | (IA) | 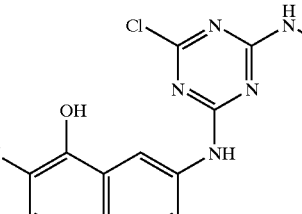 (IICH) | 80:20 |

-continued
| Example | Dye of general formula (I) | Dye of general formula (II) | ratio of dyes (I):(II) |
|---|---|---|---|
| 76 | (IA) | 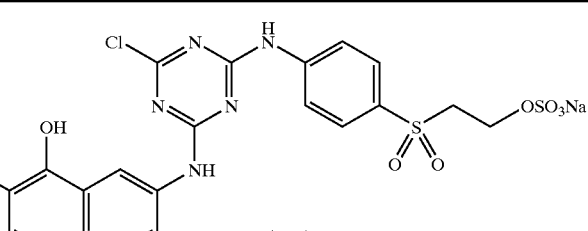 (IICJ) | 75:25 |
| 77 | (IA) | (IICK) 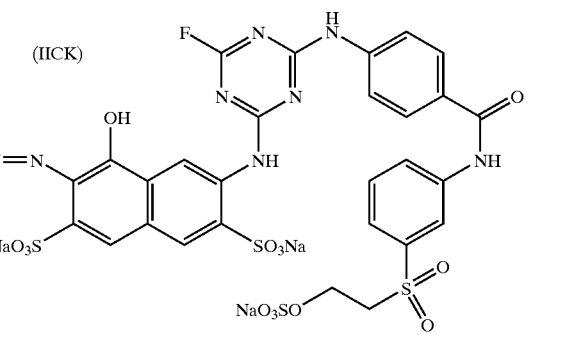 | 80:20 |
| 78 | (IA) | 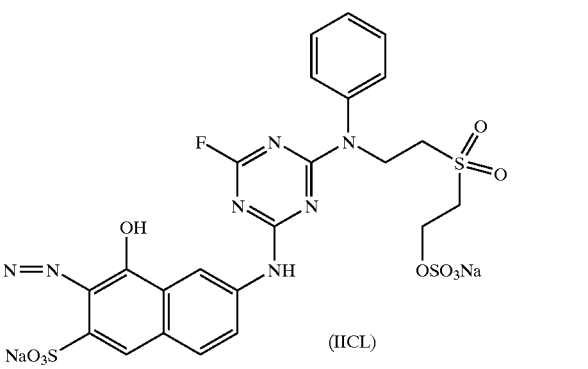 (IICL) | 75:25 |
| 79 | (IA) | 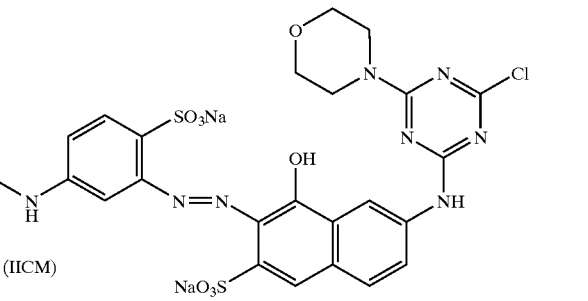 (IICM) | 80:20 |

-continued
| Example | Dye of general formula (I) | Dye of general formula (II) | ratio of dyes (I):(II) |
|---|---|---|---|
| 80 | (IA) | (IICN) 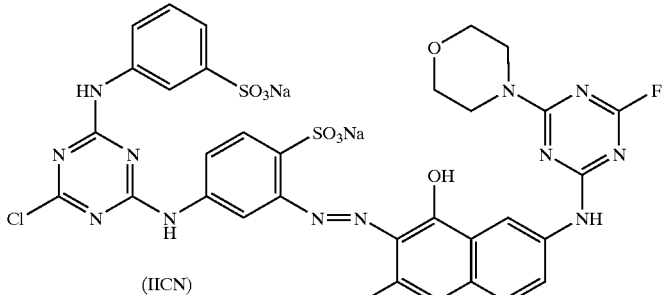 | 80:20 |
| 81 | (IA) | (IICP) 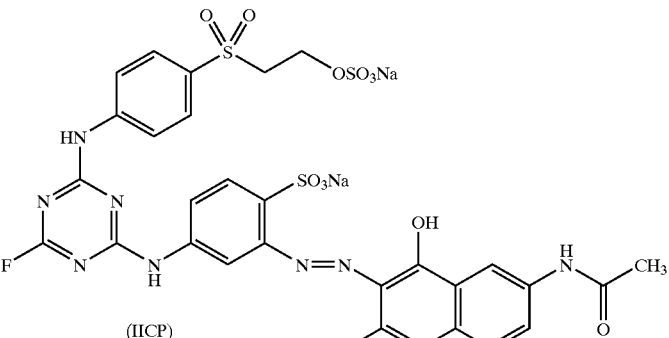 | 85:15 |
| 82 | (IA) | (IICQ) 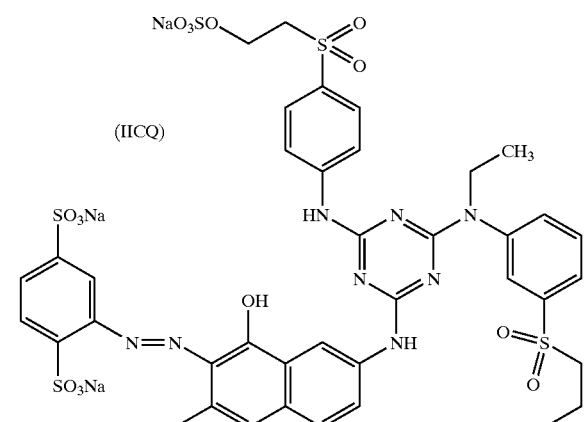 | 85:15 |
| 83 | (IA) | (IICR) 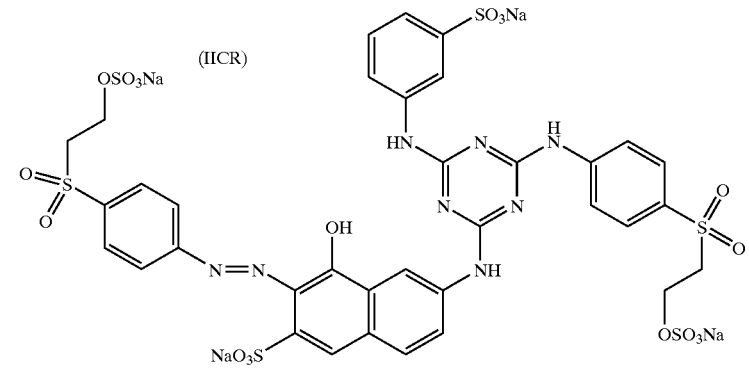 | 80:20 |

-continued

| Example | Dye of general formula (I) | Dye of general formula (II) | ratio of dyes (I):(II) |
|---|---|---|---|
| 84 | (IA) | (IICS) | 80:20 |
| 85 | (IA) | (IICT) | 75:25 |
| 86 | (IA) | (IICU) | 80:20 |
| 87 | (IA) | (IICW) | 85:15 |

| Example | Dye of general formula (I) | Dye of general formula (II) | ratio of dyes (I):(II) |
|---|---|---|---|
| 88 | (IA) | (IICY) | 75:25 |
| 89 | (IA) | (IICZ) | 85:15 |
| 90 | (IA) | (IIDA) | 80:20 |
| 91 | (IA) | (IIDB) | 85:15 |

-continued
| Example | Dye of general formula (I) | Dye of general formula (II) | ratio of dyes (I):(II) |
|---|---|---|---|
| 92 | (IA) | 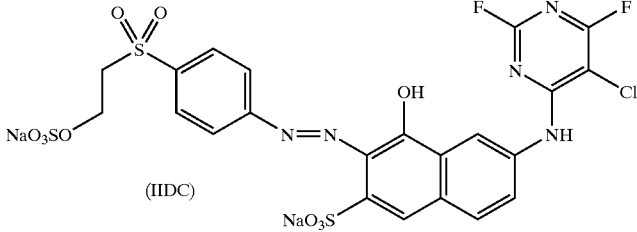 (IIDC) | 80:20 |
| 93 | (IA) | 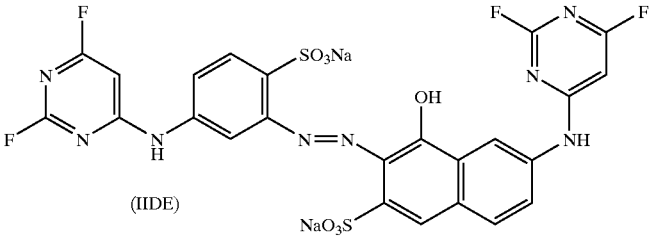 (IIDE) | 80:20 |
| 94 | (IA) | 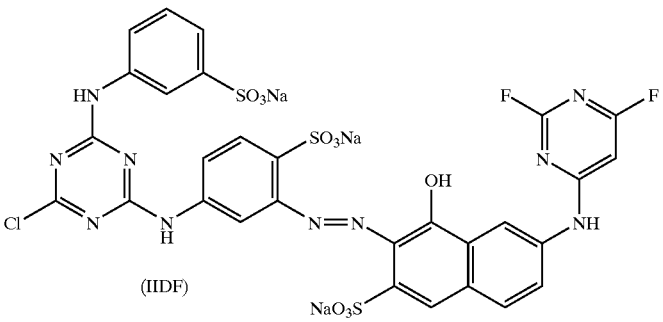 (IIDF) | 80:20 |
| 95 | (IA) | 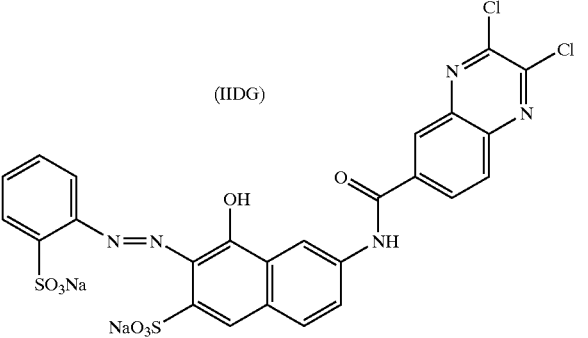 (IIDG) | 70:30 |

-continued
| Example | Dye of general formula (I) | Dye of general formula (II) | ratio of dyes (I):(II) |
|---|---|---|---|
| 96 | (IA) | 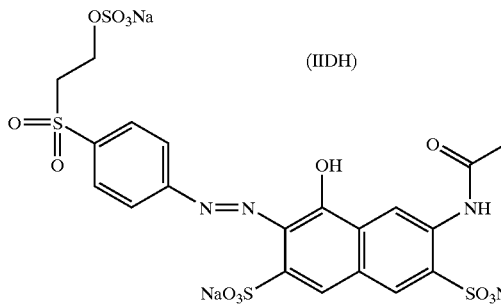 (IIDH) | 80:20 |
EXAMPLES 97–191
Examples 1, 2 and 4–96 were repeated using dye (IB) instead of dye (IA).
EXAMPLES 192–286
Examples 1, 2 and 4–96 were repeated using dye (IC) instead of dye (IA):
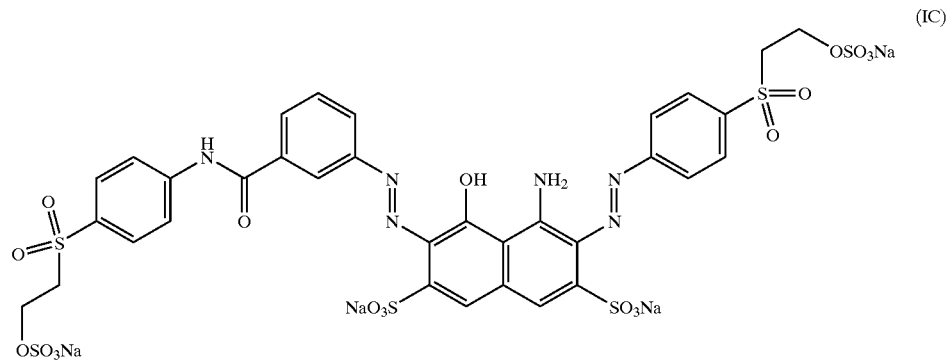
(IC)
EXAMPLES 287–381
Examples 1, 2 and 4–96 were repeated using dye (ID) instead of dye (IA):
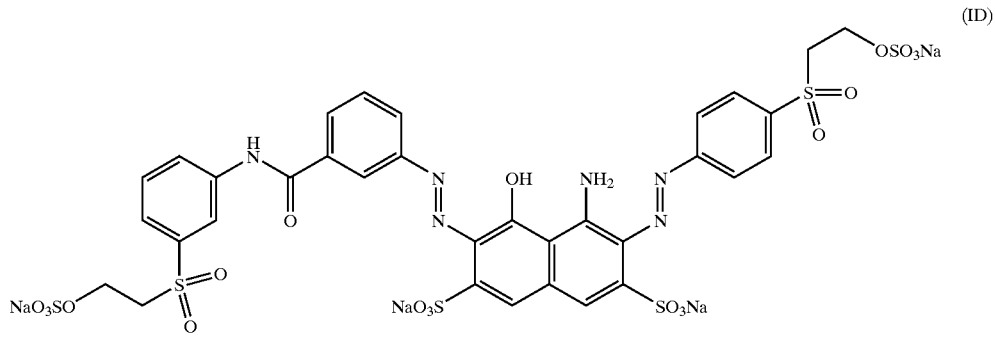
(ID)

EXAMPLES 382–476
Examples 1, 2 and 4–96 were repeated using dye (IE) instead of dye (IA):
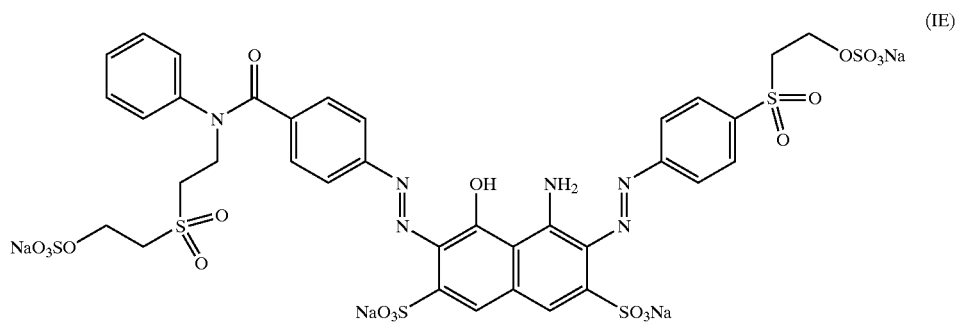
Dye mixtures prepared according to examples 1, 2 or 3

| Example | Dye of general formula (I) | Dye of general formula (II) | ratio of dyes (I):(II) |
|---|---|---|---|
| 477 | (IA) | (IIDJ) | 75:25 |
| 478 | (IA) | (IIDK) | 80:20 |
| 479 | (IB) | (IIDL) | 75:25 |

| Example | Dye of general formula (I) | Dye of general formula (II) | ratio of dyes (I):(II) |
|---|---|---|---|
| 480 | (IC) | (IIDM) | 75:25 |
| 481 | (ID) | (IIDN) | 75:25 |
| 482 | (IA) | (IIDP) | 75:25 |

-continued
| Example | Dye of general formula (I) | Dye of general formula (II) | ratio of dyes (I):(II) |
|---|---|---|---|
| 483 | (IA) | 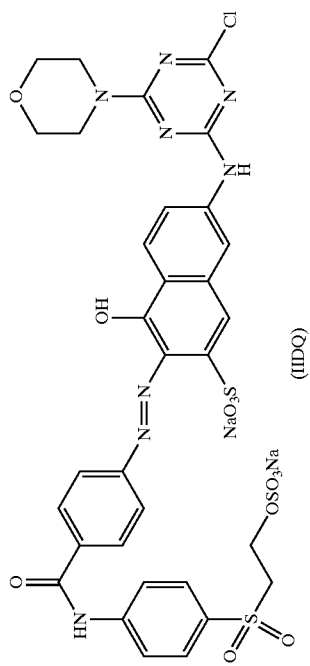 (IIDQ) | 80:20 |
| 484 | (IB) | 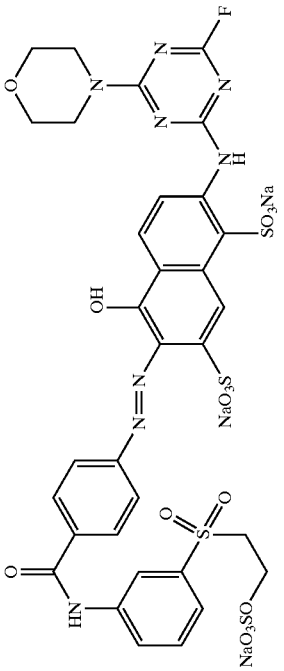 (IIDR) | 75:25 |

-continued

| Example | Dye of general formula (I) | Dye of general formula (II) | ratio of dyes (I):(II) |
|---|---|---|---|
| 485 | (IC) | (IIDS) | 80:20 |
| 486 | (ID) | (IIDT) | 75:25 |

| Example | Dye of general formula (I) | Dye of general formula (II) | ratio of dyes (I):(II) |
|---|---|---|---|
| 487 | (IA) | (IIDU) | 85:15 |
| 488 | (IB) | (IIDW) | 80:20 |

-continued
| Example | Dye of general formula (I) | Dye of general formula (II) | ratio of dyes (I):(II) |
|---|---|---|---|
| 489 | (IA) | 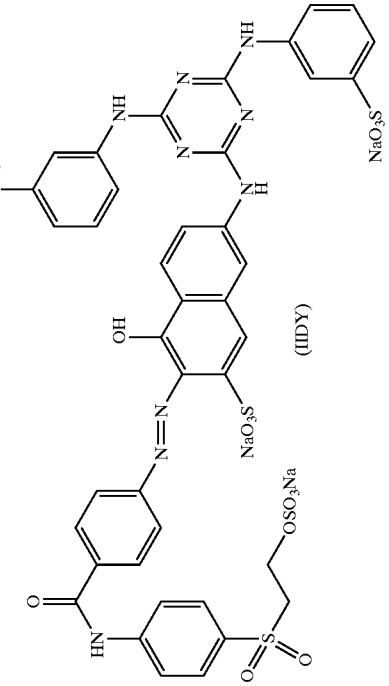 (IIDY) | 75:25 |
| 490 | (IB) | 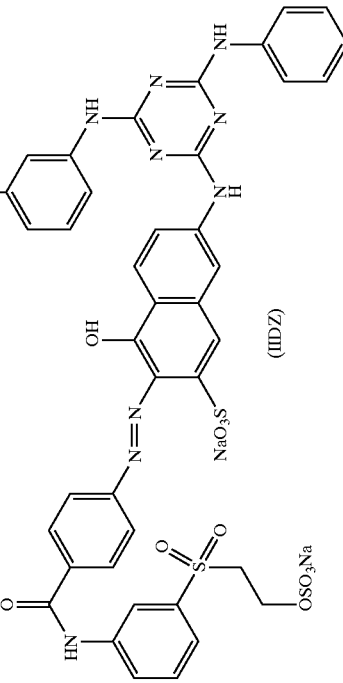 (IIDZ) | 80:20 |

| Example | Dye of general formula (I) | Dye of general formula (II) | ratio of dyes (I):(II) |
|---|---|---|---|
| 491 | (IA) | (IIEA) | 75:25 |
| 492 | (IB) | (IIEB) | 75:25 |
| 493 | (IA) | (IIEC) | 75:25 |

| Example | Dye of general formula (I) | Dye of general formula (II) | ratio of dyes (I):(II) |
|---|---|---|---|
| 494 | (IA) | (IIED) | 75:25 |
| 495 | (IB) | (IIEE) | 85:15 |
| 496 | (IC) | (IIEF) | 75:25 |

| Example | Dye of general formula (I) | Dye of general formula (II) | ratio of dyes (I):(II) |
|---|---|---|---|
| 497 | (ID) | (IIEG) | 80:20 |
| 498 | (IA) | (IIEH) | 80:20 |

-continued

| Example | Dye of general formula (I) | Dye of general formula (II) | ratio of dyes (I):(II) |
|---|---|---|---|
| 499 | (IB) | (IIEJ) | 75:25 |
| 500 | (IC) | (IIEF) | 80:20 |

-continued
| Example | Dye of general formula (I) | Dye of general formula (II) | ratio of dyes (I):(II) |
|---|---|---|---|
| 501 | (ID) | (IIEL) 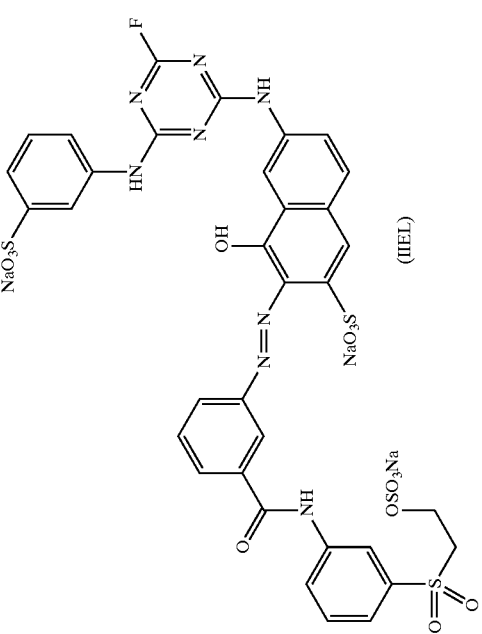 | 80:20 |
| 502 | (IA) | (IIEM) 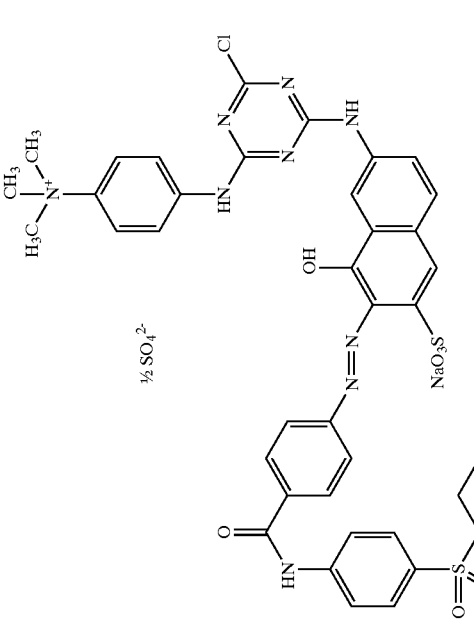 | 85:15 |

| Example | Dye of general formula (I) | Dye of general formula (II) | ratio of dyes (I):(II) |
|---|---|---|---|
| 503 | (IB) | (IIEN) | 80:20 |

-continued

| Example | Dye of general formula (I) | Dye of general formula (II) | ratio of dyes (I):(II) |
|---|---|---|---|
| 504 | (IA) | (IIEP) | 80:20 |
| 505 | (IA) | (IIEQ) | 80:20 |

| Example | Dye of general formula (I) | Dye of general formula (II) | ratio of dyes (I):(II) |
|---|---|---|---|
| 506 | (IB) | (IIER) | 75:25 |
| 507 | (IF) | (IIA) | 85:15 |
| 508 | (IF) | (IIC) | 75:25 |
| 509 | (IF) | (IIE) | 80:20 |
| 510 | (IF) | (IIM) | 75:25 |
| 511 | (IF) | (IIP) | 80:20 |
| 512 | (IF) | (IIR) | 80:20 |
| 513 | (IF) | (IIS) | 80:20 |
| 514 | (IF) | (IIT) | 70:30 |
| 515 | (IF) | (IIW) | 80:20 |
| 516 | (IF) | (IIZ) | 70:30 |
| 517 | (IF) | (IIAA) | 85:15 |
| 518 | (IF) | (IIAB) | 80:20 |
| 519 | (IF) | (IIAZ) | 80:20 |
| 520 | (IF) | (IIBA) | 80:20 |
| 521 | (IF) | (IIBB) | 80:20 |
| 522 | (IF) | (IIBS) | 70:30 |

| Example | Dye of general formula (I) | Dye of general formula (II) | ratio of dyes (I):(II) |
|---|---|---|---|
| 523 | (IF) | (IIBZ) | 80:20 |
| 524 | (IF) | (IICA) | 75:25 |
| 525 | (IF) | (IICB) | 85:15 |
| 526 | (IF) | (IICC) | 75:25 |
| 527 | (IF) | (IICD) | 70:30 |
| 528 | (IF) | (IICE) | 80:20 |
| 529 | (IF) | (IICG) | 80:20 |
| 530 | (IF) | (IICH) | 80:20 |
| 531 | (IF) | (IICR) | 80:20 |
| 532 | (IF) | (IICS) | 80:20 |
| 533 | (IF) | (IICT) | 80:20 |
| 534 | (IF) | (IIDC) | 80:20 |
| 535 | (IF) | (IIDH) | 80:20 |
| 536 | (IF) | (IIES) | 80:20 |
| 537 | (IF) | (IIET) | 85:15 |

-continued
| Example | Dye of general formula (I) | Dye of general formula (II) | ratio of dyes (I):(II) |
|---|---|---|---|
| 538 | (IF) | 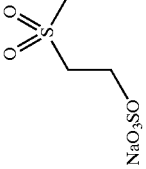 (IIEU) | 80:20 |

EXAMPLES 539–570

Examples 507–538 were repeated using dye (IG) instead of dye (IF):

Dyeing Example 1

2 parts of a dyestuff mixture according to example 1, 2 or 3 are dissolved in 999 parts of water and 5 parts of sodium

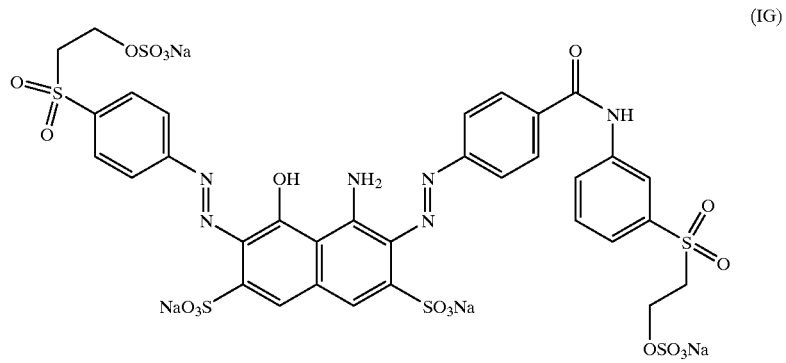

(IG)

EXAMPLES 571–602

Examples 507–538 were repeated using dye (IH) instead of dye (IF):

carbonate, 0,7 parts of sodium hydroxide (as a 32,5% solution in water) and 1 part of a wetting agent, if necessary, are added. 100 g of a cotton fabric are brought into the dye

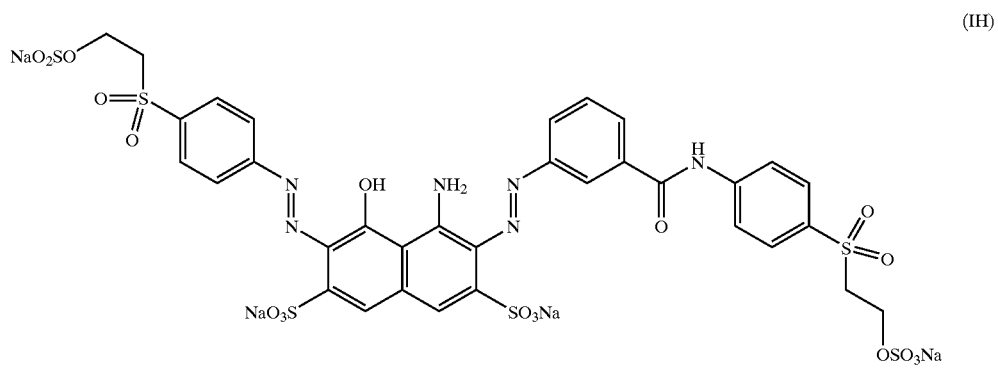

(IH)

EXAMPLES 603–634

Examples 507–538 were repeated using dye (IJ) instead of dye (IF):

bath. The temperature of the dye bath is held at 25° C. for 10 minutes, then raised to 40–60° C. within 30 minutes and dyeing is continued for another 60–90 minutes at this Dyeing example 1

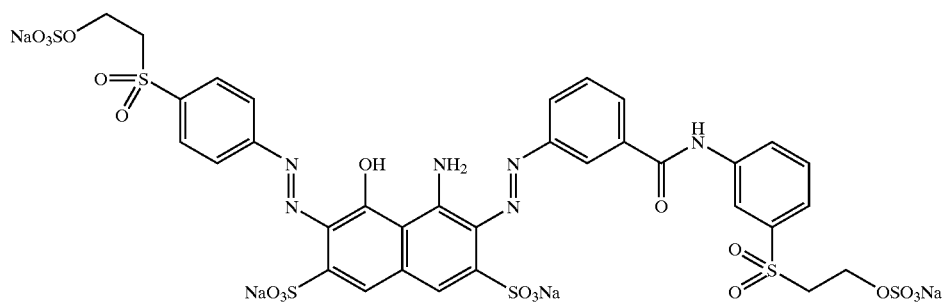

(IJ)

temperature. Afterwards the dyed fabric is first rinsed with water for 2 minutes and then rinsed with desalted water for 5 minutes. Afterwardes the fabric is neutralized for 10 minutes at 40° C. in 1000 parts of an aqueous solution containing 1 part of 50% acetic acid. The cotton fabric is rinsed with desalted water at 70° C. and soaped at the boiling point for 15 minutes, again rinsed and air-dried or ironed, resulting a deep navy to grey dyeing with very good fastness properties.

Dyeing Example 2

4 parts of a dyestuff mixture according to example 1, 2 or 3 are dissolved in 999 parts of water and 5 parts of sodium chloride, 7 parts of sodium carbonate, 0,7 parts of sodium hydroxide (as a 32,5% solution in water) and 1 part of a wetting agent, if necessary, are added. 100 g of a cotton fabric are brought into the dye bath. The dyeing and aftertreatment process is carried out as described in dyeing example 1, resulting a deep navy to black dyeing with very good fastness properties.

Dyeing Example 3

8 parts of a dyestuff mixture according to example 1, 2 or 3 are dissolved in 997 parts of water and 10 parts of sodium chloride, 10 parts of sodium carbonate, 1,3 parts of sodium hydroxide (as a 32,5% solution in water) and 1 part of a wetting agent, if necessary, are added. 100 g of a cotton fabric are brought into the dye bath. The dyeing and aftertreatment process is carried out as described in dyeing example 1, resulting a deep black dyeing with very good fastness properties.

All the references described above are incorporated by reference in their entirety for all usefull purposes.

What is claimed is:

1. A black dye mixture comprising one or more reactive dyes of the general formula (I)

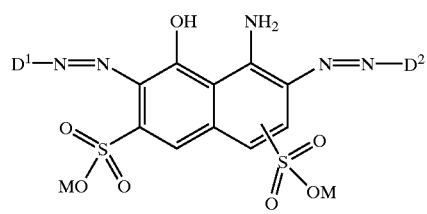

(I)

and one or more reactive dyes of the general formula (IIc) and/or (IId),

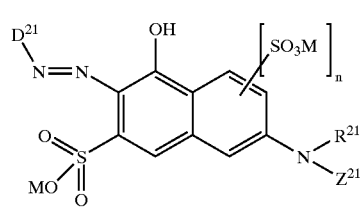

(IIc)

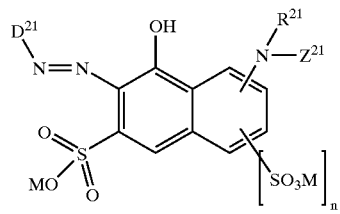

(IId)

where $D^1$ and $D^2$ independently represent a group of the general formula (1)

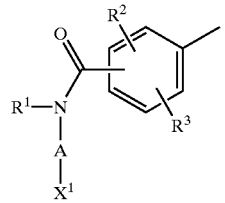

(1)

wherein $R^1$ is hydrogen, $(C_1-C_4)$-alkyl, aryl or phenyl substituted by one, two or three independent groups selected from the group consisting of $(C_1-C_4)$-alkyl, $(C_1-C_4)$-alkoxy, hydroxyl, sulfo, carboxyl, amido and halogen;

$R^2$ and $R^3$ are independently hydrogen, $(C_1-C_4)$-alkyl, $(C_1-C_4)$-alkoxy, hydroxyl, sulfo, carboxyl, amido or halogen; and A is a phenylene group of the general formula (2)

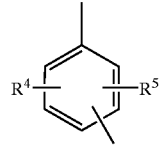

(2)

where $R^4$ and $R^5$ are independently hydrogen, $(C_1-C_4)$-alkyl, $(C_1-C_4)$-alkoxy, hydroxyl, sulfo, carboxyl, amido or halogen; or A is a naphthylene group of the general formula (3)

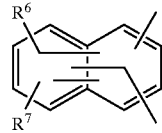

(3)

where $R^6$ and $R^7$ are independently hydrogen, $(C_1-C_4)$-alkyl, $(C_1-C_4)$-alkoxy, hydroxyl, sulfo, carboxyl, amido or halogen; or A is a polymethylene group of the general formula (4)

$$-(CR^8R^9)_k-\qquad(4)$$

where
k is an integer greater than 1 and
$R^8$ and $R^9$ are independently hydrogen, $(C_1-C_4)$-alkyl, $(C_1-C_4)$-alkoxy, hydroxyl, cyano, amido, halogen or aryl; and
$X^1$ is hydrogen or —$SO_2$-Z;
or $D^1$ and $D^2$ independently represent a phenyl group of the general formula (5)

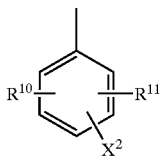

(5)

where
$R^{10}$ and $R^{11}$ are independently hydrogen, $(C_1-C_4)$-alkyl, $(C_1-C_4)$-alkoxy, hydroxyl, sulfo, carboxyl, amido or halogen; and
$X^2$ has one of the meanings of $X^1$;
or $D^1$ and $D^2$ independently represent a naphthyl group of the general formula (6)

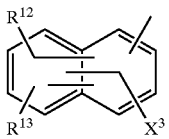

(6)

where
$R^{12}$ and $R^{13}$ are independently hydrogen, $(C_1-C_4)$-alkyl, $(C_1-C_4)$-alkoxy, hydroxyl, sulfo, carboxyl, amido or halogen;
$X^3$ has one of the meanings of $X^1$;
Z is —CH=$CH_2$, —$CH_2CH_2Z^1$ or hydroxyl,
where
$Z^1$ is hydroxyl or an alkali-detachable group;
M is hydrogen or an alkali metal;
$D^{21}$ has one of the meanings of $D^1$ or $D^2$ or is a group of formula (7) or (8)

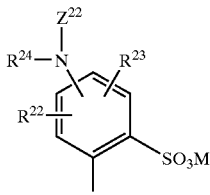

(7)

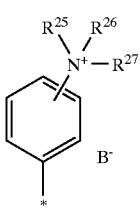

(8)

where
$R^{22}$ and $R^{23}$ have independently of one another one of the meanings of $R^2$ and $R^3$;

$R^{24}$ is hydrogen, $(C_1-C_4)$-alkyl, phenyl which is unsubstituted or substituted by $(C_1-C_4)$-alkyl, $(C_1-C_4)$-alkoxy, sulfo, halogen, or carboxy; and
$Z^{22}$ is a group of the general formula (9) or (10) or formula (11)

(9)

(10)

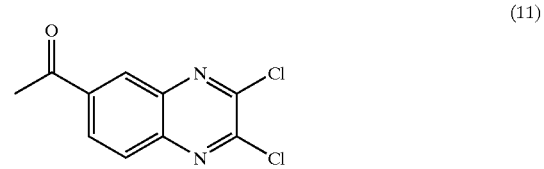

(11)

wherein
V is fluorine or chlorine;
$U^1$ and $U^2$ are independently of one another fluorine, chlorine or hydrogen; and
$Q^1$ and $Q^2$ are independently of one another chlorine, fluorine, cyanamido, hydroxy, $(C_1-C_6)$-alkoxy, phenoxy, sulfophenoxy, mercapto, $(C_1-C_6)$-alkylmercapto, pyridino, carboxypyridino, carbamoylpyridino, or a group of the general formula (12) or (13)

(12)

(13)

where
$R^{2'}$ is hydrogen, $(C_1-C_6)$-alkyl, sulfo-$(C_1-C_6)$-alkyl, phenyl which is unsubstituted or substituted by at least one of the following groups: $(C_1-C_4)$-alkyl, $(C_1-C_4)$-alkoxy, sulfo, halogen, carboxy, acetamido or ureido;
$R^{3'}$ and $R^{4'}$ have independently of one another one of the meanings of $R^{2'}$, or form a cyclic ring system, such as —$(CH_2)_j$— with j being 4 or 5, or alternatively —$(CH_2)_2$-E-$(CH_2)_2$— with E being oxygen, sulfur, sulfo, or —$NR^{5'}$— with $R^{5'}$ being $(C_1-C_6)$-alkyl;
W is phenylene which is unsubstituted or substituted by 1 or 2 substituents selected from the group of $(C_1-C_4)$-alkyl, $(C_1-C_4)$-alkoxy, carboxy, sulfo, chlorine and bromine; or is $(C_1-C_4)$-alkylene-arylene; or (C$_2$–C$_6$)-alkylene, which is optionally interrupted by oxygen, sulfur, sulfono, amino, carbonyl or carbonamido; or is phenylene-CONH-phenylene which is unsubstituted or substituted by (C$_1$–C$_4$)-alkyl, (C$_1$–C$_4$)-alkoxy, hydroxyl, sulfo, carboxyl, amido, ureido or halogen, or naphthylene which is unsubstituted or substituted by one or two sulfo groups; and Z is as defined above;

R$^{25}$, R$^{26}$ and R$^{27}$ are independently (C$_1$–C$_4$)-alkyl or (C$_1$–C$_4$)-hydroxyalkyl;

B$^−$ if is an equivalent for an anion;

R$^{21}$ has one of the meanings of R$^{24}$;

Z$^{21}$ is hydrogen, (C$_2$–C$_6$)-acyl, aroyl which is unsubstituted or substituted by (C$_1$–C$_4$)-alkyl, (C$_1$–C$_4$)-alkoxy, sulfo, carboxyl or halogen, or has one of the meanings of Z$^{22}$; and n is 0 or 1;

in the general formula (I) at least one of D$^1$ and D$^2$ is a group of the general formula (1), where, if A is a group of the general formula (4), R$^1$ is aryl or substituted aryl and where the reactive dye of the general formula (I) contains at least one —SO$_2$-Z group.

2. The mixture according to claim 1, wherein R$^{3'}$ and R$^{4'}$ form a cyclic ring system having —(CH$_2$)$_j$— with j being 4 or 5, or alternatively —(CH$_2$)$_2$-E-(CH$_2$)$_2$— with E being oxygen, sulfur, sulfo or —NR$^{5'}$— with R$^{5'}$ being (C$_1$–C$_6$)-alkyl; and B$^−$ if is hydrogensulfate, sulfate, fluoride, chloride, bromide, dihydrogenphosphate, hydrogenphosphate, phosphate, hydroxide or acetate.

3. The mixture according to claim 1, wherein R$^1$ to R$^5$, R$^8$ to R$^{11}$, R$^{22}$ and R$^{24}$ being hydrogen, R$^6$, R$^7$, R$^{12}$, R$^{13}$, R$^{22}$ and R$^{23}$ being hydrogen or sulfo and R$^{25}$, R$^{26}$ and R$^{27}$ being methyl.

4. The mixture according to claim 2, wherein R$^1$ to R$^5$, R$^8$ to R$^{11}$, R$^{21}$ and R$^{24}$ being hydrogen, R$^6$, R$^7$, R$^{12}$, R$^{13}$, R$^{22}$ and R$^{23}$ being hydrogen or sulfo and R$^{25}$, R$^{26}$ and R$^{27}$ being methyl.

5. The mixture according to claim 1, wherein Z is vinyl, β-chloroethyl or β-sulfatoethyl.

6. The mixture according to claim 4, wherein Z is vinyl, β-chloroethyl or β-sulfatoethyl.

7. The mixture according to claim 1, wherein n is 0.

8. The mixture according to claim 6, wherein n is 0.

9. The mixture according to claim 1, which comprise one or more dyes according to the general formula (Ia)

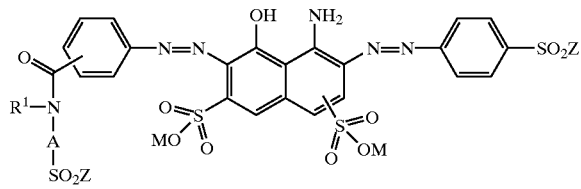

(Ia)

and one or more dyes of the general formula (IIa)

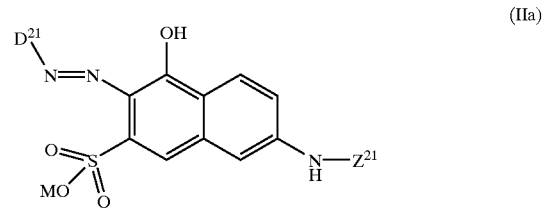

(IIa)

wherein M, A, R$^1$, Z, D$^{21}$ and Z$^{21}$ are as defined in claim 1.

10. The mixture according to claim 9, wherein R$^1$ is hydrogen, A is phenylene and Z is vinyl or β-sulfatoethyl in the general formula (Ia).

11. The mixture according to claim 1, wherein D$^{21}$ in general formula (IIc) and/or (IId) has one of the meanings of 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 6-(β-sulfatoethylsulfonyl)-1-sulfo-naphth-2-yl, 3- or 4-vinylsulfonyl-phenyl, 4-(3-(2-sulfatoethylsulfonyl)-phenylcarbamoyl)-phenyl, 4-(4-(2-sulfatoethylsulfonyl)-phenylcarbamoyl)-phenyl, 3-(3-(2-sulfatoethylsulfonyl)-phenylcarbamoyl)-phenyl, 3-(4-(2-sulfatoethylsulfonyl)-phenylcarbamoyl)-phenyl, 1-sulfo-4-(2,4-difluoro-pyrimidin-6-yl)-amino-2-phenyl or 1-sulfo-4-(4,6-difluoro-pyrimidin-2-yl)-amino-2-phenyl, 2-sulfophenyl, 4-methyl-2-sulfophenyl or 1,5-disulfonaphth-2-yl.

12. The mixture according to claim 8, wherein D$^{21}$ in general formula (IIc) and/or (IId) has one of the meanings of 3-(β-sulfatoethylsulfonyl)-phenyl, 4-(β-sulfatoethylsulfonyl)-phenyl, 2-sulfo-4-(β-sulfatoethylsulfonyl)-phenyl, 2-methoxy-5-(β-sulfatoethylsulfonyl)-phenyl, 2,5-dimethoxy-4-(β-sulfatoethylsulfonyl)-phenyl, 2-methoxy-5-methyl-4-(β-sulfatoethylsulfonyl)-phenyl, 6-(β-sulfatoethylsulfonyl)-1-sulfo-naphth-2-yl, 3- or 4-vinylsulfonyl-phenyl, 4-(3-(2-sulfatoethylsulfonyl)-phenylcarbamoyl)-phenyl, 4-(4-(2-sulfatoethylsulfonyl)-phenylcarbamoyl)-phenyl, 3-(3-(2-sulfatoethylsulfonyl)-phenylcarbamoyl)-phenyl, 3-(4-(2-sulfatoethylsulfonyl)-phenylcarbamoyl)-phenyl, 1-sulfo-4-(2,4-difluoro-pyrimidin-6-yl)-amino-2-phenyl or 1-sulfo-4-(4,6-difluoro-pyrimidin-2-yl)-amino-2-phenyl, 2-sulfophenyl, 4-methyl-2-sulfophenyl or 1,5-disulfonaphth-2-yl.

13. The mixture according to claim 1, wherein Z$^{21}$ in general formula (IIc) and/or (IId) has one of the meanings of 2,4-dichloro-1,3,5-triazin-6-yl, 2-chloro-4-morpholino-1,3,5-triazin-6-yl, 2-chloro-4-(3-sulfophenylamino)-1,3,5-triazin-6-yl, 2-chloro-4-(4-sulfophenylamino)-1,3,5-triazin-6-yl, 2-chloro-4-cyanamido-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-morpholino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(3-trimethylammoniumphenylamino)-1,3,5-triazin-6-yl, 2-fluoro-4-(4-trimethylammoniumphenylamino)-1,3,5-triazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(3-(vinylsulfonyl)-phenylamino)-1,3,5-triazin-6-yl, 2-fluoro-4-(4-(vinylsulfonyl)-phenylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 2,3-dichlorochinoxalin-6-carbonyl or acetyl.

14. The mixture according to claim 12, wherein $Z^{21}$ in general formula (IIc) and/or (IId) has one of the meanings of 2,4-dichloro-1,3,5-triazin-6-yl, 2-chloro-4-morpholino-1,3,5-triazin-6-yl, 2-chloro-4-(3-sulfophenylamino)-1,3,5-triazin-6-yl, 2-chloro-4-(4-sulfophenylamino)-1,3,5-triazin-6-yl, 2-chloro-4-cyanamido-1,3,5-triazin-6-yl, 2-chloro-4-(3-(2-sulfatoethylsulfonyl)-phenylamino)-1,3,5-triazin-6-yl, 2-chloro-4-(4-(2-sulfatoethylsulfonyl)-phenylamino)-1,3,5-triazin-6-yl, 2-chloro-4-(3-(vinylsulfonyl)-phenylamino)-1,3,5-triazin-6-yl, 2-chloro-4-(4-(vinylsulfonyl)-phenylamino)-1,3,5-triazin-6-yl, 2-chloro-4-(N-methyl-N-(2-(2-sulfatoethylsulfonyl)-ethyl)-amino)-1,3,5-triazin-6-yl, 2-chloro-4-(N-phenyl-N-(2-(2-sulfatoethylsulfonyl)-ethyl)-amino)-1,3,5-triazin-6-yl, 2-fluoro-4-morpholino-1,3,5-triazin-6-yl, 2-fluoro-4-(2-sulfophenylamino)-1,3,5-triazin-6-yl, 2-fluoro-4-(3-sulfophenylamino)-1,3,5-triazin-6-yl, 2-fluoro-4-(4-sulfophenylamino)-1,3,5-triazin-6-yl, 2-fluoro-4-(3-trimethylammoniumphenylamino)-1,3,5-triazin-6-yl, 2-fluoro-4-(4-trimethylammoniumphenylamino)-1,3,5-triazin-6-yl, 2-fluoro-4-(3-(2-sulfatoethylsulfonyl)-phenylamino)-1,3,5-triazin-6-yl, 2-fluoro-4-(4-(2-sulfatoethylsulfonyl)-phenylamino)-1,3,5-triazin-6-yl, 2-fluoro-4-(3-(vinylsulfonyl)-phenylamino)-1,3,5-triazin-6-yl, 2-fluoro-4-(4-(vinylsulfonyl)-phenylamino)-1,3,5-triazin-6-yl, 2-fluoro-4-(N-methyl-N-(2-(2-sulfatoethylsulfonyl)-ethyl)-amino)-1,3,5-triazin-6-yl, 2-fluoro-4-(N-phenyl-N-(2-(2-sulfatoethylsulfonyl)-ethyl)-amino)-1,3,5-triazin-6-yl, 2,4-difluoro-pyrimidin-6-yl, 4,6-difluoro-pyrimidin-2-yl, 5-chloro-2,4-difluoro-pyrimidin-6-yl, 5-chloro-4,6-difluoro-pyrimidin-2-yl, 2,3-dichlorochinoxalin-6-carbonyl or acetyl.

15. The mixture according to claim 1, wherein a dye of formula (I) is present in the mixture in an amount of from 30 to 95% by weight; a dye of the formula (IIc) and/or (IId) is present in the mixture in an amount of from 5 to 70% by weight.

16. The mixture according to claim 14, wherein a dye of formula (I) is present in the mixture in an amount of from 30 to 95% by weight; a dye of the formula (IIc) and/or (IId) is present in the mixture in an amount of from 5 to 70% by weight.

17. The mixture according to claim 1, further comprising a monoazo dye of formula (14) in a total amount of 0.5 to 6.0% by weight and/or a monoazo dye of formula (15) in a total amount of 0.5 to 6.0% by weight

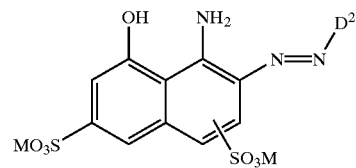

(14)

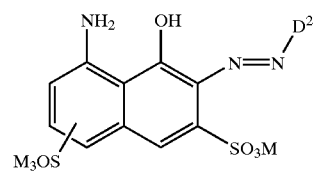

(15)

wherein $D^2$ and M are as defined in claim 1.

18. The dye mixture according to claim 1, wherein said at least one dye of general formula (I) is present in an amount up to 95% by weight.

19. A process for the preparation of the dye mixture according to claim 1, which comprises mechanically mixing the individual dyes of the formulae (I) and (IIc) and/or (IId) in solid form or in form of aqueous solutions.

20. A process for the preparation of the dye mixture according to claim 1, which comprises diazotizing an amine of the general formula (16)

$D^2$-NH$_2$ (16), wherein $D^2$ is defined below, in a strongly acidic medium and then carrying out the coupling reaction of the 1-amino-8-napthol-3,6-disulfonic acid or 1-amino-8-napthol-4,6-disulfonic acid with the diazo component at a pH below 2 to form the red compound (14) followed by diazotation of an amine of the general formula (17)

$D^1$-NH$_2$ (17), wherein $D^1$ is defined below, in a strongly acidic medium and then carrying out the second coupling reaction with the monoazo dye product (14) to form the disazo dye conforming to the formula (I) at a pH between 4 and 8 and followed by addition of an aqueous solution of the optionally N-substituted 2-Amino-7-sulfo-5-naphthol or 2-Amino-6-sulfo-8-naphthol to the coupling reaction to form the dye conforming to the formula (IIc) and/or (IId) which is carried out in the same pH-range between 4 and 7.5 followed by isolation of the dyestuff mixture from the solution and $D^1$ and $D^2$ independently represent a group of the general formula (1)

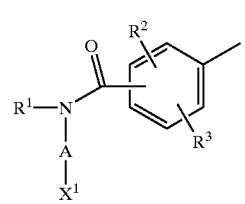

(1)

wherein
$R^1$ is hydrogen, $(C_1-C_4)$-alkyl, aryl or phenyl substituted by on, two or three independent groups selected from the group consisting of $(C_1-C_4)$-alkyl, $(C_1-C_4)$-alkoxy, hydroxyl, sulfo, carboxyl, amido and halogen;

$R^2$ and $R^3$ are independently hydrogen, $(C_1-C_4)$-alkyl, $(C_1-C_4)$-alkoxy, hydroxyl, sulfo, carboxyl, amido or halogen; and A is a phenylene group of the general formula (2)

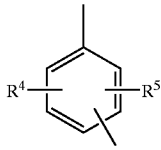

(2)

where $R^4$ and $R^5$ are independently hydrogen, $(C_1-C_4)$-alkyl, $(C_1-C_4)$-alkoxy, hydroxyl, sulfo, carboxyl, amido or halogen; or A is a naphthylene group of the general formula (3)

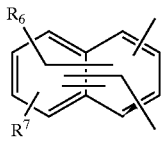

(3)

where $R^6$ and $R^7$ are independently hydrogen, $(C_1-C_4)$-alkyl, $(C_1-C_4)$-alkoxy, hydroxyl, sulfo, carboxyl, amido or halogen; or A is a polymethylene group of the general formula (4)

 (4)

where k is an integer greater than 1 and $R^8$ and $R^9$ are independently hydrogen, $(C_1-C_4)$-alkyl, $(C_1-C_4)$-alkoxy, hydroxyl, cyano, amido, halogen or aryl; and $X^1$ is hydrogen or $-SO_2-Z$;

or $D^1$ and $D^2$ each represent a phenyl group of the general formula (5)

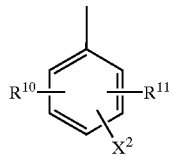

(5)

where $R^{10}$ and $R^{11}$ are independently hydrogen, $(C_1-C_4)$-alkyl, $(C_1-C_4)$-alkoxy, hydroxyl, sulfo, carboxyl, amido or halogen; and $X^2$ has one of the meanings of $X^1$;

or $D^1$ and $D^2$ each represent a naphthyl group of the general formula (6)

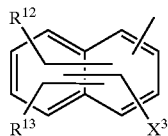

(6)

where $R^{12}$ and $R^{13}$ are independently hydrogen, $(C_1-C_4)$-alkyl, $(C_1-C_4)$-alkoxy, hydroxyl, sulfo, carboxyl, amido or halogen;

$X^3$ has one of the meanings of $X^1$;

Z is $-CH=CH_2$, $-CH_2CH_2Z^1$ or hydroxyl, where $Z^1$ is hydroxyl or an alkali-detachable group;

M is hydrogen or an alkali metal;

and with the proviso that $D^1$ and $D^{21}$ in the general formulae (I) and formula (IIc) and/or (IId) have the same meaning.

21. A process for dyeing hydroxy- and/or carboxamido-containing fiber material, which comprises applying the dye mixture as claimed in claim 1 to the material and the dyes are fixed to the material by means of (a) heat (b) with the aid of an alkali or (c) heat and with the aid of an alkali.

* * * * *

UNITED STATES PATENT AND TRADEMARK OFFICE
CERTIFICATE OF CORRECTION

PATENT NO. : 6,946,006 B2
DATED : September 20, 2005
INVENTOR(S) : Eichhorn et al.

It is certified that error appears in the above-identified patent and that said Letters Patent is hereby corrected as shown below:

Column 103,
Line 40, "to $R^{11}$, $R^{22}$ and $R^{24}$ being hydrogen, $R^5$, $R^7$, $R^{12}$, $R^{13}$, $R^{22}$" should read -- to $R^{11}$, $R^{21}$ and $R^{24}$ being hydrogen, $R^6$, $R^7$, $R^{12}$, $R^{13}$, $R^{22}$ --.

Column 108,
Line 30, "$^3$ has one of the meanings of $X^1$;" should read -- "$X^3$ has one of the meanings of $X^1$" --.

Signed and Sealed this

Twenty-seventh Day of December, 2005

JON W. DUDAS
*Director of the United States Patent and Trademark Office*